(12) United States Patent
de Oliveira Felho et al.

(10) Patent No.: US 11,603,497 B2
(45) Date of Patent: *Mar. 14, 2023

(54) SYNERGIZED ACETALS COMPOSITION AND METHOD FOR SCAVENGING SULFIDES AND MERCAPTANS

(71) Applicant: Clariant International, Ltd., Muttenz (CH)

(72) Inventors: Antonio Pedro de Oliveira Felho, São Paulo (BR); Aline Yae Kina, São Paulo (BR); Grahame N. Taylor, Jersey Village, TX (US); Fabian Schneider, Eppelheim (DE); Julie Murison, Frankfurt (DE); Stefan Hauck, Alsbach-Haehnlein (DE); Mike Sahl, Bad Camberg (DE); Matthias Krull, Harxheim (DE); Jonathan James Wylde, The Woodlands, TX (US)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,959

(22) Filed: Jan. 23, 2020

(65) Prior Publication Data

US 2020/0157439 A1 May 21, 2020

Related U.S. Application Data

(62) Division of application No. 15/853,114, filed on Dec. 27, 2017, now abandoned.

(51) Int. Cl.

| $C10G$ 29/24 | (2006.01) |
| $C10G$ 29/22 | (2006.01) |
| $C10G$ 29/20 | (2006.01) |
| $B01D$ 53/52 | (2006.01) |
| $B01D$ 53/78 | (2006.01) |
| $C02F$ 1/20 | (2006.01) |

(Continued)

(52) U.S. Cl.
CPC .............. *C10G 29/24* (2013.01); *B01D 53/52* (2013.01); *B01D 53/78* (2013.01); *C02F 1/20* (2013.01); *C09K 8/532* (2013.01); *C10G 29/20* (2013.01); *C10G 29/22* (2013.01); *C10L 3/103* (2013.01); *B01D 53/1493* (2013.01); *B01D 2251/21* (2013.01); *B01D 2252/202* (2013.01); *B01D 2252/205* (2013.01); *B01D 2252/504* (2013.01); *B01D 2256/24* (2013.01); *B01D 2257/304* (2013.01); *B01D 2257/306* (2013.01); *C02F 2101/101* (2013.01); *C02F 2103/10* (2013.01); *C09K 2208/20* (2013.01); *C10G 2300/1051* (2013.01); *C10G 2300/207* (2013.01)

(58) Field of Classification Search
CPC ........ C10G 29/24; C10G 29/22; C10G 29/20; C10G 2300/1051; C10G 2300/207; B01D 53/52; B01D 53/78; B01D 2251/21; B01D 2252/202; B01D 2252/205; B01D 2252/504; B01D 2256/24; B01D 2257/304; B01D 2257/306; B01D 53/1493; C02F 1/20; C02F 2103/10; C02F 2101/101; C09K 2208/20; C09K 8/532; C10L 3/103

See application file for complete search history.

(56) References Cited

U.S. PATENT DOCUMENTS

| 2,956,963 A | 10/1960 | Baird |
| 3,880,754 A | 4/1975 | Brost |

(Continued)

FOREIGN PATENT DOCUMENTS

| AU | 2002216263 | 8/2007 |
| AU | 2016239582 | 11/2017 |

(Continued)

OTHER PUBLICATIONS

"0714 Normal pressure hydrocephalus: The predictive value of cerebrospinal fluid tap-test ED—Friedman Joseph H; Bhidayasiri Roongroj; Truong Daniel D", Journal of Neurological Scien, Elsevier Scientific Publishing Co, Amsterdam, NL, vol. 238, Jan. 1, 2005 (Jan. 1, 2005), pp. 5281-S282, XP005546902.

European Search Report for EP18150085, dated Apr. 20, 2018, 7 pages.

(Continued)

*Primary Examiner* — Andrew J. Oyer
(74) *Attorney, Agent, or Firm* — Tod A. Waldrop

(57) ABSTRACT

This invention provides a composition comprising
I. at least one reaction product between a nitrogen-free monohydric alcohol and an aldehyde or ketone, and
II. at least one reaction product between a monosaccharide having 3 to 6 carbon atoms and/or an oligosaccharide being formed by oligomerization of monosaccharides having 3 to 6 carbon atoms and an aldehyde or ketone, and optionally
III. at least one reaction product from
III.a) formaldehyde, and
III.b) an amine, selected from the group consisting of primary alkyl amines having 1 to 4 carbon atoms, and primary hydroxy alkyl amines having 2 to 4 carbon atoms, and optionally
IV. at least one solid suppression agent selected from the group consisting of
IV(a). alkali or alkaline earth metal hydroxides
IV(b). mono-, di- or tri-hydroxy alkyl, aryl or alkylaryl amines,
IV(c). mono-, di- or tri-alkyl, aryl or alkylaryl primary, secondary and tertiary amines or
IV(d). multifunctional amines and
IV(e). mixtures of compounds of groups IV(a) to IV(c).
wherein alkyl is $C_1$ to $C_{15}$, aryl is $C_6$ to $C_{15}$ and alkylaryl is $C_7$ to $C_{15}$.

40 Claims, No Drawings

(51) Int. Cl.
    *C09K 8/532*     (2006.01)
    *C10L 3/10*     (2006.01)
    *C02F 103/10*     (2006.01)
    *C02F 101/10*     (2006.01)
    *B01D 53/14*     (2006.01)

(56) References Cited

U.S. PATENT DOCUMENTS

| | | |
|---|---|---|
| 3,880,784 A | 4/1975 | Wagner |
| 3,928,211 A | 12/1975 | Browning |
| 4,219,508 A * | 8/1980 | Wagner .................. B01J 19/245 549/450 |
| 4,680,127 A | 7/1987 | Edmondson |
| 4,978,512 A | 12/1990 | Dillon |
| 5,087,761 A | 2/1992 | Kikabhai |
| 5,347,004 A | 9/1994 | Rivers |
| 5,486,605 A | 1/1996 | Gatlin |
| 5,728,263 A | 3/1998 | Mattila |
| 6,117,310 A | 9/2000 | Rivers |
| 6,348,483 B1 | 2/2002 | Beilfuss |
| 6,355,679 B1 | 3/2002 | Beilfuss |
| 8,329,063 B2 | 12/2012 | Beilfuss |
| 10,131,861 B2 | 11/2018 | Klug |
| 2004/0096382 A1 * | 5/2004 | Smith ................ C10L 3/10 423/226 |
| 2005/0218379 A1 | 10/2005 | Beilfuss |
| 2006/0079720 A1 | 4/2006 | Xie |
| 2010/0324182 A1 | 12/2010 | Ing |
| 2012/0055848 A1 | 3/2012 | Subramaniyam |
| 2012/0128561 A1 | 5/2012 | Blair |
| 2012/0241361 A1 | 9/2012 | Ramachandran |
| 2013/0172623 A1 | 7/2013 | Kaplan |
| 2013/0240409 A1 | 9/2013 | Subramaniyam |
| 2016/0175769 A1 | 6/2016 | Kamoun |
| 2017/0055524 A1 | 3/2017 | Baur |
| 2017/0081597 A1 | 3/2017 | Fuji |
| 2017/0218293 A1 | 8/2017 | Klug |
| 2018/0105732 A1 | 4/2018 | Okocha |
| 2018/0346825 A1 | 12/2018 | Rotta |
| 2019/0194523 A1 | 6/2019 | De Oliveira Filho |
| 2019/0194551 A1 | 6/2019 | De Oliveira Filho |
| 2020/0109329 A1 | 4/2020 | De Oliveira Filho |

FOREIGN PATENT DOCUMENTS

| | | |
|---|---|---|
| CN | 1125430 A | 6/1996 |
| CN | 1139683 | 1/1997 |
| CN | 1315856 | 10/2001 |
| CN | 1426384 A | 6/2003 |
| CN | 1552523 A | 12/2004 |
| CN | 1845890 A | 10/2006 |
| CN | 101903449 | 12/2010 |
| CN | 102481512 | 5/2012 |
| CN | 103209752 | 7/2013 |
| CN | 103221125 | 7/2013 |
| CN | 103459561 | 12/2013 |
| CN | 103748124 | 4/2014 |
| CN | 105749591 A | 7/2016 |
| CN | 106164228 | 11/2016 |
| CN | 111163855 A | 5/2020 |
| DE | 2721186 | 11/1978 |
| EP | 0405341 | 1/1991 |
| EP | 2267098 | 12/2010 |
| EP | 3064062 | 9/2016 |
| EP | 3080046 | 10/2016 |
| EP | 3478789 B1 | 2/2020 |
| EP | 3578622 B1 | 10/2020 |
| GB | 1092657 A | 11/1967 |
| KR | 20170046845 | 5/2017 |
| TW | 201343606 | 11/2013 |
| WO | 9802501 A | 1/1998 |
| WO | 02051968 A1 | 7/2002 |
| WO | 2010138842 | 12/2010 |
| WO | 2014031537 | 2/2014 |
| WO | 2015088342 | 6/2015 |
| WO | 2016050782 A1 | 4/2016 |
| WO | 2017079817 | 5/2017 |
| WO | 2018001631 | 1/2018 |

OTHER PUBLICATIONS

European Search Report for EP18150087, dated Apr. 20, 2018, 7 pages.
H. Schiweck et al., "Sugar Alcohols", Ullmann's Encyclopedia of Industrial Chemistry, (2012), 37 pages.
International Search Report for PCT/EP2017/061830, dated Jul. 28, 2017, 3 pages.
International Search Report for PCT/EP2018/081002, dated Jan. 31, 2019, 3 pages.
International Search Report for PCT/EP2018/081133, dated Jan. 31, 2019, 3 pages.
Joseph Frederic Walker, Formaldehyde, Robert E. Krieger Publishing Company Inc., (1975), p. 264-284.
Obakore W. Agbroko, Comprehensive Review of H2S Scvanger Technologies for Oil and Gas Streams, ChemBioEng Rev 2017, vol. 4, p. 339-359, XP055463021.
Wang Zongde et al., English abstract, "Synthesis of Hydroxycitronellal Acetal Compounds and Their Repellent Activity to Mosquitoes", Acta Entomologica Sinica, pp. 1241-1247, 2010.

\* cited by examiner

SYNERGIZED ACETALS COMPOSITION AND METHOD FOR SCAVENGING SULFIDES AND MERCAPTANS

The invention relates to a composition and a process for scavenging hydrogen sulfide from liquids and/or gas by using a synergistic combination of acetals in admixture with a reaction product from formaldehyde and amines and/or a solids suppression agent. The formulations containing the inventive composition have particular applicability in scavenging hydrogen sulfide and/or mercaptans yet at the same time prevent the formation of unwanted emulsions and/or deposition of unwanted by-products often associated with using chemistries and/or formulations of the prior art.

The presence of compounds containing a sulfhydryl group (—SH) and particularly of hydrogen sulfide pose challenges in many industries. Their presence can create a significant health, safety and environmental challenge. There are many different types of compounds containing a sulfhydryl group ("sulfhydryl compounds"), with the most commonly encountered molecules including hydrogen sulfide ($H_2S$), organo-sulfur compounds containing R—SH groups (also called mercaptans), thiocarboxylic acids RC(O)SH, dithio-carboxylic acids RC(S)SH, and related compounds.

In the oil and gas industry the $H_2S$ content of crude oil and natural gas in many areas of the world is high enough to present environmental and safety hazards. Hydrogen sulfide is a flammable, corrosive, and highly toxic gas. $H_2S$ is the most reduced form of sulfur and is produced by sulfate reducing bacteria (SRB) that are often found in anaerobic oilfield environments, or caused by thermal cracking and thermochemical sulfate reduction (TSR) by hydrocarbons. As crude oil is produced, it is depressurized and dissolved $H_2S$ is released and can then be transferred to, for example, oil based drilling fluid during the drilling process and this can become a hazard as the drilling fluid is recirculated from the well to the surface. During the production phase of crude oil and natural gas $H_2S$ gas can create a significant asset integrity risk as it is an acid gas and upon dissolving into produced water creates a very corrosive environment.

In addition, the presence of $H_2S$ increases the risks of sulfide stress cracking, hydrogen embrittlement and pitting corrosion of some structural materials and requires to be removed in order for fluids and gases to be safely processed.

The odor of sulfhydryl compounds is also a challenge in, for example, metal working environments, but equally in water treatment processes, either municipal (e.g. waste water treatment) or industrial (e.g. recycling of mining water). SRB are often present in the recirculating fluid systems, and though the bacteria can usually be controlled by the use of biocidal compositions, often control of the biology in the system gets lost which results in the development of hazardous $H_2S$ and/or mercaptans in the system. Furthermore biocides are inefficient at removing $H_2S$ after it forms and only anecdotally scavenge $H_2S$, via either oxidation (e.g. sodium hypochlorite application) or due to the release of low levels of aldehyde during their breakdown (e.g. with glutaraldehyde). Sulfhydryl compounds and particularly $H_2S$ can present environmental, toxicity and integrity challenges in gaseous phases in confined spaces, as for instance in sewage treatment facilities and particularly in shipping and storage containers for moisture sensitive materials that may emit $H_2S$ which can accumulate in the gaseous headspace. It would be desirable to have a scavenger that can reduce the $H_2S$ concentration in such locations.

Most commonly used sulfhydryl scavengers are based on metals as for example copper, zinc or iron which are converted to insoluble sulfides. A number of alternative, metal free methods have been proposed to scavenge hydrogen sulfide and to control sulfhydryl odors in hydrocarbon containing systems, including:

WO-98/02501 describes the use of bisoxazolidines prepared by the reaction of 1,2- or 1,3-amino alcohols containing 3 to 7 carbon atoms with aldehydes containing 4 or fewer carbon atoms, as for example 3,3'-methylenebis-5-methyl-oxazolidine. The relative oil and water solubility of these products can be controlled through the choice of starting materials. These bisoxazolidines react with sulfhydryl compounds present in oil and gas streams to neutralize and therefore scavenge them.

U.S. Pat. No. 5,347,004 teaches the use of reaction products of alkoxyalkylene amine, optionally in admixture with ammonia and/or alkylamines with aldehydes to remove $H_2S$ from gas streams which are sparged into water solutions of the reaction products.

WO-2014/031537 teaches the use of an aldehyde releasing compound, preferably a hydantoin compound, to remove sulfhydryl compounds from hydrocarbon fluids.

U.S. Pat. No. 3,928,211 describes the use of inorganic zinc salts (most preferably zinc carbonate) preferably dispersed in aqueous or non-aqueous oil well drilling fluids with an organic dispersant such as lignin containing materials for scavenging hydrogen sulfide in aqueous drilling fluids.

WO-2002/051968 teaches a process for reducing the level of hydrogen sulfide in a liquid or gas by treatment of the liquid or gas with an $H_2S$-scavenger product derivable from the reaction of a carbonyl group-containing compound with an alcohol, thiol, amide, thioamide, urea or thiourea. The carbonyl group-containing compound is preferably formaldehyde, and preferably the product is derivable by reaction of formaldehyde with an amine-free alcohol or urea selected from ethylene glycol, propylene glycol, glycerol, diethylene glycol, triethylene glycol, ethyl alcohol, n-butanol, a sugar, a low molecular weight polyvinyl alcohol, castor oil fatty acid and urea. More especially, the scavenger product is used with an amine, especially monoethanolamine or monoethanolamine triazine.

U.S. Pat. No. 4,978,512 teaches a method of reducing $H_2S$ levels, the method comprising bringing the $H_2S$ containing medium into contact with inter alia acetals and bisoxazolidines.

The object of this invention is to provide compositions which can be used for scavenging of sulfhydryl compounds in crude oil, gas production, water production, water injection and combinations thereof, preferably, but not limited to $H_2S$ and/or mercaptans. The compositions of the invention should be notable for improved safety and performance compared to the formulations and chemistries of the prior art, i.e. they should contain low amounts of toxic substances like free formaldehyde even after prolonged storage. They should have a higher scavenging efficiency than scavengers according to the state of the art and especially for the treatment of gases as for example of natural gas they should assure an efficient scavenging of sulfhydryl compounds within a short contact time. Furthermore it is desirable to have a scavenger that does not produce unwanted solid by-products and/or form emulsions that can inadvertently contaminate the very systems they are treating. In particular the formation of solid products which may plug lines and vessels shall be retarded or even inhibited in order to facilitate the removal of the sulfhydryl reaction products formed during the scavenging process.

Surprisingly it has been found that a composition comprising at least one reaction product between a monohydric alcohol and an aldehyde or ketone and at least one reaction product of a monosaccharide having 3 to 6 carbon atoms and/or an oligosaccharide being formed by oligomerization of monosaccharides having 3 to 6 carbon atoms with an aldehyde having one or two carbon atoms shows improved capability in scavenging sulfhydryl compounds in comparison to the respective reaction products of the individual alcohols. Such composition allows i) for a lower dosage rate of scavenger to obtain the same level of residual amount of sulfhydryl compound and/or ii) for a lower level of residual amount of sulfhydryl compound with the same dosage rate of scavenger. Furthermore, in combination with at least one reaction product from formaldehyde and an amine (hereinafter also referred to as "synergist") the kinetics of scavenging $H_2S$ and/or mercaptans provided by the reaction products of a monohydric alcohol with an aldehyde or ketone and a monosaccharide having 3 to 6 carbon atoms and/or an oligosaccharide being formed by oligomerization of monosaccharides having 3 to 6 carbon atoms with an aldehyde having one or two carbon atoms can be significantly accelerated. Alternatively to the synergist or in addition to the synergist, the admixture of a solids suppression agent as a further synergistic additive facilitates the removal of sulfhydryl reaction products especially in continuously operated scavenging processes. Furthermore the admixture of the synergist and/or the further synergist extends the gas breakthrough time of sulfhydryl compounds in a contact tower containing the reaction products of a monohydric alcohol with an aldehyde and/or ketone and a monosaccharide having 3 to 6 carbon atoms and/or an oligosaccharide being formed by oligomerization of monosaccharides having 3 to 6 carbon atoms with an aldehyde having one or two carbon atoms.

The use of the synergist and/or the further synergist of the invention enables the mixed hemiacetals and acetals to react much more efficiently with sulfhydryl compounds and especially with $H_2S$. The mechanism believed to be involved in this reaction, but which should not be considered to be limiting to the invention in any way, occurs due to the likelihood that the synergist component reacts preferentially with $H_2S$ forming an intermediate reaction complex which then in turn reacts with a molecule of hemiacetal respectively acetal reforming a molecule of synergist and liberation of the corresponding alcohol present in the (hemi-)acetal. After the $H_2S$ scavenging process the residual synergist then works as a corrosion inhibitor, protecting the integrity of the pipelines and equipment in which it has been applied.

Within the scope of this application the expressions "hemiacetal" and "acetal" encompass the reaction products of an alcohol with either an aldehyde or a ketone, i. e. they include hemiketals respectively ketals when using a ketone instead of an aldehyde in the reaction with an monohydric alcohol. The expression "(hemi-)acetals" encompasses hemiacetals, acetals and their mixtures which are often formed during reaction of alcohols and carbonyl compounds.

In a first aspect of the invention, there is provided a composition comprising
 I. at least one reaction product between a nitrogen-free monohydric alcohol and an aldehyde or ketone, and
 II. at least one reaction product between a monosaccharide having 3 to 6 carbon atoms and/or an oligosaccharide being formed by oligomerization of monosaccharides having 3 to 6 carbon atoms with an aldehyde having one or two carbon atoms.

In a second aspect of the invention there is provided a composition comprising
 I. at least one reaction product between a nitrogen-free monohydric alcohol and an aldehyde or ketone, and
 II. at least one reaction product between a monosaccharide having 3 to 6 carbon atoms and/or an oligosaccharide being formed by oligomerization of monosaccharides having 3 to 6 carbon atoms with an aldehyde having one or two carbon atoms, and
 III. at least one reaction product from formaldehyde and ammonia and/or an amine selected from the group consisting of primary alkyl amines having 1 to 10 carbon atoms and primary hydroxy alkyl amines having 2 to 10 carbon atoms.

In a third aspect of the invention there is provided a composition comprising
 I. at least one reaction product between a nitrogen-free monohydric alcohol and an aldehyde or ketone, and
 II. at least one reaction product between a monosaccharide having 3 to 6 carbon atoms and/or an oligosaccharide being formed by oligomerization of monosaccharides having 3 to 6 carbon atoms with an aldehyde or ketone, and
 IV. at least one inorganic or organic alkaline compound that functions as a solids suppression agent.

In a fourth aspect of the invention there is provided a composition comprising
 I. at least one reaction product between a nitrogen-free monohydric alcohol and an aldehyde or ketone, and
 II. at least one reaction product between a monosaccharide having 3 to 6 carbon atoms and/or an oligosaccharide being formed by oligomerization of monosaccharides having 3 to 6 carbon atoms with an aldehyde having one or two carbon atoms, and
 III. at least one reaction product from formaldehyde and ammonia and/or an amine selected from the group consisting of primary alkyl amines having 1 to 10 carbon atoms and primary hydroxy alkyl amines having 2 to 10 carbon atoms, and
 IV. at least one inorganic or organic alkaline compound that functions as a solids suppression agent.

In a fifth aspect of the invention, there is provided the use of the composition of the first, second, third or fourth aspect of the invention as a scavenger for sulfhydryl compounds for application in oilfield operations and process systems.

In a sixth aspect of the invention, there is provided a process for scavenging sulfhydryl compounds in oilfield operations and process systems, the process comprising adding to a system susceptible to liberation of sulfhydryl compounds the composition of the first, second, third or fourth aspect of the invention.

In a seventh aspect of the invention there is provided the use of at least one reaction product from
 III. formaldehyde and ammonia and/or an amine, selected from the group consisting of primary alkyl amines having 1 to 10 carbon atoms and primary hydroxy alkyl amines having 2 to 10 carbon atoms,
as a synergist in the reaction between
 a) I. the reaction product between a nitrogen-free monohydric alcohol and an aldehyde or ketone, and
 a) II. the reaction product between a monosaccharide having 3 to 6 carbon atoms and/or an oligosaccharide being formed by oligomerization of monosaccharides having 3 to 6 carbon atoms with an aldehyde having one or two carbon atoms, and b) a sulfhydryl compound.

In an eighth aspect of the invention there is provided the use of at least

IV. one inorganic or organic alkaline compound as a solids suppression agent in the reaction between a) I. the reaction product between a nitrogen-free monohydric alcohol and an aldehyde or ketone, and a) II. the reaction product between a monosaccharide having 3 to 6 carbon atoms and/or an oligosaccharide being formed by oligomerization of monosaccharides having 3 to 6 carbon atoms with an aldehyde or ketone, and b) a sulfhydryl compound.

In preferred embodiments of the invention, at least one demulsifier (V) and/or corrosion inhibitor (VI) is present in any aspect of the invention.

Group I

The group I compound is the reaction product of a monohydric alcohol and an aldehyde or ketone. The monohydric alcohol does not contain nitrogen.

Preferred monohydric alcohols as starting materials are alkyl, aryl and arylalkyl alcohols containing one hydroxy group and 1 to 15 carbon atoms, more preferably 1 to 10 carbon atoms and especially 2 to 5 carbon atoms as for example 1 to 5, or 2 to 15 or 2 to 10 carbon atoms. The hydroxyl group of preferred monohydric alcohols is bound to an aliphatic, alicyclic and/or aromatic moiety, preferably to an aliphatic, alicyclic and/or aromatic hydrocarbon moiety, and more especially to an aliphatic or cycloaliphatic hydrocarbon moiety. The aliphatic and cycloaliphatic moieties may be saturated or unsaturated, preferably they are saturated. Aliphatic moieties with 3 or more carbon atoms may be linear or branched. More especially the monohydric alcohol is aliphatic. In particular the alcohol is an alkyl alcohol. Examples for preferred alcohols are methanol, ethanol, propanol, iso-propanol, n-butanol, iso-butanol, tert-butanol and the various isomers of pentanol, hexanol, heptanol and methanol and ethanol.

Preferred aldehydes or ketones as starting materials contain one or more carbonyl groups, more preferably one or two carbonyl groups and especially one carbonyl group. Furthermore, preferred aldehydes and ketones contain 1 to 10 carbon atoms, more preferably 1 to 7, and especially 1 to 4 carbon atoms. In preferred aldehydes the carbonyl group carries one and in preferred ketones two aliphatic, alicyclic and/or aromatic substituents. More preferably the substituents are aliphatic, alicyclic and/or aromatic hydrocarbon substituents and especially preferred the substituents are aliphatic hydrocarbon groups. Preferred aliphatic and cycloaliphatic substituents may be saturated or unsaturated, most preferably they are saturated. In a particularly preferred embodiment the saturated aliphatic groups are alkyl groups. In ketones both substituents may be the same or different.

In a preferred embodiment the carbonyl compound is an aldehyde, more preferably a mono- or di-aldehyde, and especially formaldehyde. It should be understood that the terms "aldehyde" and "formaldehyde" include precursors like e.g. para-formaldehyde, formalin, and other chemical forms from which the basic structure HCHO can be released or set free during the reaction with an alcohol. Other suitable aldehydes include, for example, acetaldehyde, propionaldehyde, butyraldehyde, glutaraldehyde and glyoxal. Suitable ketones include, for example, acetone, methyl ethyl ketone, diethylketone, methyl isopropyl ketone, hexanones and heptanones.

Mixtures of two or more carbonyl compounds, for example two or more of the aldehydes mentioned above, e.g. formaldehyde and one or more other aldehydes, may be used if desired.

In the reaction between monohydric alcohol and aldehyde and/or ketone part or all of the alcohols may be converted to hemiacetals and/or acetals. In a preferred embodiment, the reaction product is a hemiacetal. In a preferred embodiment at least 50 mol-% of the alcohol, more preferably 60 to 99 mol-% of the alcohol, especially 65 to 95 mol-% of the alcohol and especially preferred 70 to 90 mol-% of the alcohol as for example more than 60 mol-%, more than 65 mol-%, more than 70 mol-%, % of the alcohol or 50 to 99 mol-%, 50 to 95 mol-%, 50 to 90 mol-%, 60 to 95%, 60 to 90 mol-%, 65 to 99 mol-%, 65 to 90 mol-%, 70 to 99 mol-% or 70 to 95 mol-% of the alcohol are converted to hemiacetals and/or acetals. In case the degree of conversion is low some unreacted monohydric alcohol remains in the composition. The presence of residual alcohol in the reaction mixture has proven to be advantageous as upon its reaction with sulfhydryl compounds often the formation of solid precipitate gets reduced. Furthermore, remaining alcohol will act as a solvent.

Group II

The group II compound is the reaction product of a monosaccharide having 3 to 6 carbon atoms or an oligosaccharide being formed by oligomerization of monosaccharides having 3 to 6 carbon atoms with an aldehyde having one or two carbon atoms. The monosaccharide having 3 to 6 carbon atoms respectively the oligosaccharide being formed by oligomerization of monosaccharides having 3 to 6 carbon atoms and the aldehyde having one or two carbon atoms are different. In a preferred embodiment the group II compound is the reaction product of a monosaccharide having 3 to 6 carbon atoms with an aldehyde having one or two carbon atoms. In a further preferred embodiment the group II compound is the reaction product of an oligosaccharide being formed by oligomerization of monosaccharides having 3 to 6 carbon atoms with an aldehyde having one or two carbon atoms.

In a preferred embodiment the monosaccharide having 3 to 6 carbon atoms is a polyhydroxyaldehyde (aldose). In a further preferred embodiment the monosaccharide having 3 to 6 carbon atoms is a polyhydroxyketone (ketose). In a further preferred embodiment the monosaccharide having 3 to 6 carbon atoms is a mixture of a polyhydroxyaldehyde with a polyhydroxyketone.

Monosaccharides as starting materials for the group II compounds have 3 to 6, preferably 4 to 6 and especially 5 or 6 carbon atoms. Besides the carbonyl group they carry at least 2, preferably 3 to 5 and especially preferred 4 or 5 hydroxyl groups. In preferred embodiments all carbon atoms except the carbonyl carbon carry a hydroxyl group. Where different stereoisomers or enantiomers of the polyhydroxyaldehyde respectively the polyhydroxyketone exist all of them are equally suited. However, in a preferred embodiment, the polyhydroxyaldehyde respectively the polyhydroxyketone, except dihydroxyacetone, is the D-enantiomer.

Preferred polyhydroxyaldehydes and -ketones have the general formula (1)

$$C_n(H_2O)_n \hspace{4em} (1)$$

wherein n is an integer between 3 and 6 and preferably between 4 and 6 as especially preferred 5 or 6.

Preferred polyhydroxyaldehydes have the general formula (2). Preferred polyhydroxyketones have the general formula (3)

$$CHO—(CH—OH)_m—CH_2OH \quad (2)$$

$$HO—CH_2—C(=O)—(CH—OH)_p—CH_2OH \quad (3)$$

wherein m is 1, 2, 3 or 4 and p is 0, 1, 2 or 3.

In a preferred embodiment the polyhydroxyaldehyde according to formulae 1 and 2 is glyceraldehyde (n=3; m=1).

In a further preferred embodiment the polyhydroxyketone according to formulae 1 and 3 is dihydroxyacetone (n=3; p=0)

In a further preferred embodiment the polyhydroxyaldehyde according to formulae 1 and 2 is selected from the group consisting of erythrose and threose (n=4; m=2).

In a further preferred embodiment the polyhydroxyketone according to formulae 1 and 3 is erythrulose (n=4; p=1)

In a further preferred embodiment in the polyhydroxyaldehyde according to formulae 1 and 2, n is 5 and m is 3. Examples for preferred polyhydroxyaldehydes are ribose, arabinose, xylose and lyxose.

In a further preferred embodiment in the polyhydroxyketone according to formulae 1 and 3, n is 5 and p is 2. Examples for preferred polyhydroxyketones are ribulose and xylulose.

In a further preferred embodiment in the polyhydroxyaldehyde according to formulae 1 and 2 n is 6 and m is 4. Examples for preferred polyhydroxyaldehydes are allose, altrose, glucose, mannose, gulose, idose, galactose and talose.

In a further preferred embodiment in the polyhydroxyketone according to formulae 1 and 3 n is 6 and p is 3. Examples for preferred polyhydroxyketones are psicose, fructose, sorbose and tagatose.

Examples for preferred polyhydroxyaldehydes are the following aldoses:

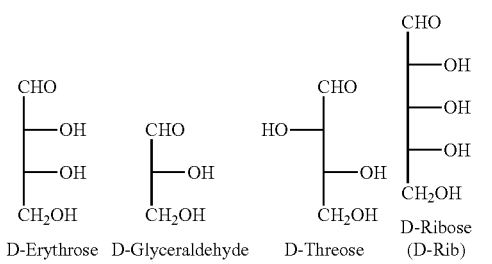
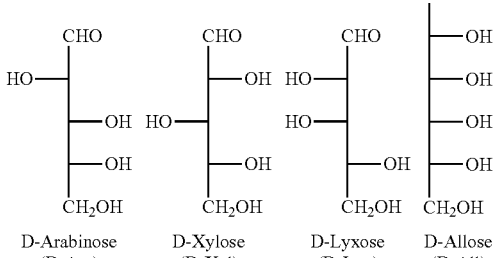

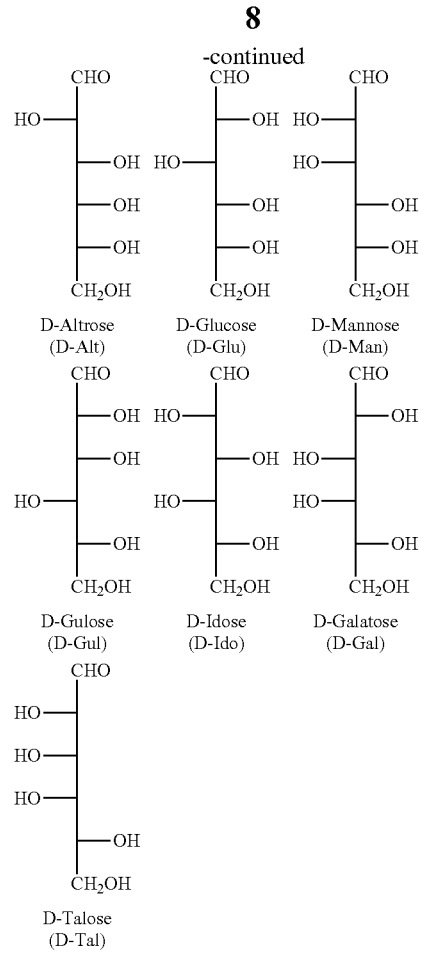

Examples for preferred polyhydroxyketones are the following ketoses:

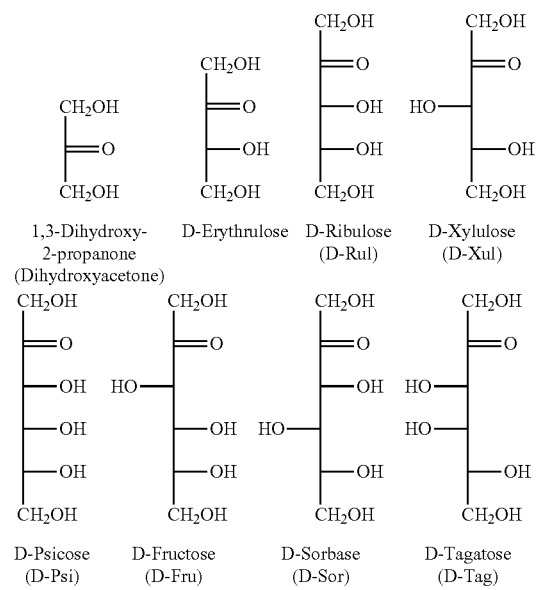

In a preferred embodiment the polyhydroxyaldehydes and/or polyhydroxyketones are in open chain form as depicted above.

In a further preferred embodiment the polyhydroxyaldehydes and/or polyhydroxyketones with 5 and 6 carbon atoms are in a cyclic hemiacetal respectively hemiketal form. Ring closure by condensation corresponds to reaction between the carbonyl group and either the C-4-OH or C-5-OH in the open chain polyhydroxyaldehydes respectively polyhydroxyketones. Cyclization involving O-4 results in a five-membered ring structurally related to furan and therefore designated as a furanose, whilst hemiacetal formation with O-5 gives rise to an essentially strain-free, hence sterically more favored, six-membered ring, a derivative of pyran, hence termed a pyranose. Most often, especially in aqueous solution, open chain form and cyclic form are in equilibrium. In a preferred embodiment the polyhydroxyaldehyde and/or polyhydroxyketone to be reacted with the aldehyde having one or two carbon atoms is a mixture of open chain and cyclic forms.

Suited cyclic structures are exemplified for glucose and fructose in formulae groups 4 and 5. The same principle is applicable for all polyhydroxyaldehydes and polyhydroxyketones where n stands for 5 or 6.

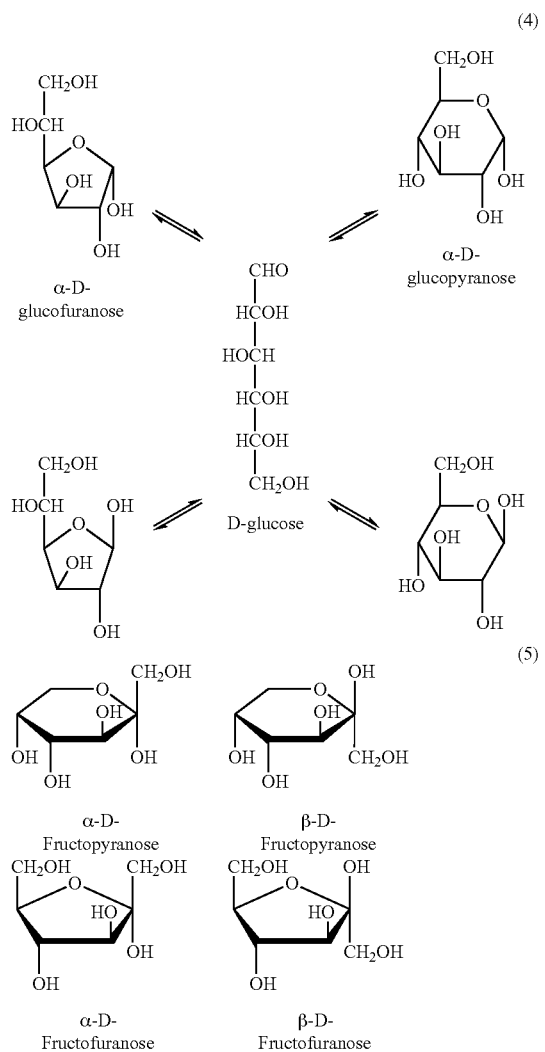

carbonyl group and hydroxyl groups, including but not limited to amino groups or carboxylic acid groups. Examples for suitable amino derivatives are aldoses which have a hydroxyl group replaced by an amino functionality as for example in D-glucosamin (2-amino-2-deoxy-D-glucose). The amino group may furthermore be acylated with a carboxylic acid having 1 to 18 carbon atoms as for example with acetic acid. Examples for suited derivatives containing a carboxylic acid group are uronic acids which contain a carboxylic acid substituting the chain terminating hydroxymethyl group, as for example D-glucuronic acid. Likewise the carboxylic acid groups may be in the form of their alkali, earth alkaline, ammonium or alkyl ammonium salt. In preferred alkyl ammonium salts the nitrogen atom carries 1, 2, 3 or 4 alkyl residues with independently 1 to 6 carbon atoms each, and optionally a hydroxyl group in the alkyl residue. In a preferred embodiment the polyhydroxyaldehyde and/or polyhydroxyketone does not contain nitrogen. In a further preferred embodiment the polyhydroxyaldehyde and/or polyhydroxyketone does not contain a carboxylic acid group nor its derivative.

The most preferred polyhydroxyaldehydes used as starting material for the group II compound are glucose, mannose, galactose, ribose, arabinose and xylose. The most preferred polyhydroxyketone used as starting materials for the group II compound is fructose.

Preferred oligosaccharides as starting materials for the group II compounds are oligomers formed by oligomerization of above described aldoses and/or ketoses having 3 to 6 carbon atoms and being joined by a glycosidic linkage. Especially preferred aldoses and ketoses as monomeric units are those having 4 to 6 carbon atoms and especially those having 5 or 6 carbon atoms. More preferred oligomers contain two to five and especially two or three monosaccharide units each joined by glycosidic linkages.

In a more preferred embodiment the oligosaccharides as starting materials for the group II compounds contain two monosaccharide units. Each unit has 3 to 6 carbon atoms, more preferred 4 to 6 carbon atoms and especially preferred 5 or 6 carbon atoms. The units are joined by a glycosidic linkage. Usually the glycosidic linkage is formed between the hydroxyl group resulting from hemiacetalisation of a first monosaccharide and subsequent acetalisation with a hydroxyl group of a further monosaccharide.

In a preferred embodiment the oligosaccharide being formed by oligomerization of monosaccharides having 3 to 6 carbon atoms is non-reducing, i.e. all the carbonyl groups are converted to acetal groups. In a further preferred embodiment the oligosaccharide being formed by oligomerization of monosaccharides having 3 to 6 carbon atoms is reducing, i.e. the oligosaccharide contains a hemiacetal group. The latter is in equilibrium with the open chain form and allows the sugar to act as a reducing agent, for example in the Fehling's test, Tollens' test or Benedict's test.

In a further preferred embodiment the oligosaccharide is a homo-oligosaccharide being formed from only one type of monosaccharide. Examples for homo-disaccharides are maltose, Isomaltose, cellobiose and trehalose. In a further preferred embodiment the oligosaccharide is a hetero-oligosaccharide being formed from at least two different monosaccharides each having 3 to 6 carbon atoms, more preferred 4 to 6 carbon atoms and especially preferred 5 or 6 carbon atoms. Examples for hetero-disaccharides are sucrose, isomaltulose, and trehalulose, each being composed of glucose and fructose as well as lactose (glucose and galactose) and lactulose (fructose and galactose). An example for a trisaccharide is raffinose.

In a preferred embodiment the polyhydroxyaldehyde and/or polyhydroxyketone as starting material for the group II compound may comprise further functionalities other than a In a preferred embodiment the disaccharide has the general formula (6)

$$C_y(H_2O)_{y-1} \quad (6)$$

wherein y is an integer between 10 and 12. Especially preferred y is 12.

Most preferred oligosaccharides formed by oligomerization of monosaccharides having 3 to 6 carbon atoms as starting materials for the group II compounds are sucrose, lactose, cellobiose and maltose.

The majority of monosaccharides having 3 to 6 carbon atoms and of oligosaccharides formed by oligomerization of monosaccharides having 3 to 6 carbon atoms occur naturally in the vegetable kingdom. Accordingly they can be extracted from plant raw material or marine algae. Others are accessible by chemical or enzymatic hydrolysis of higher polysaccharides as for example from starch or cellulose.

For the reaction between a monosaccharide having 3 to 6 carbon atoms and/or an oligosaccharide formed by oligomerization of monosaccharides having 3 to 6 carbon atoms with and aldehyde and/or ketone the monosaccharide having 3 to 6 carbon atoms and/or the oligosaccharide formed by oligomerization of monosaccharides having 3 to 6 carbon atoms may be applied as a solid or as a concentrated solution often called syrup.

Preferred aldehydes as starting materials for the group II compounds are formaldehyde, acetaldehyde and glyoxal. Most preferred aldehyde as starting material for group II compounds is formaldehyde. It should be understood that the terms "aldehyde" and "formaldehyde" include precursors like e.g. para-formaldehyde, formalin, and other chemical forms from which the basic structure HCHO can be released or set free during the reaction with an alcohol. The aldehyde used for reaction with the monosaccharide having 3 to 6 carbon atoms and/or the oligosaccharide formed by oligomerization of monosaccharides having 3 to 6 carbon atoms may be the same as the one used for the monohydric alcohol, or it may be a different one.

In the reaction between a monosaccharide having 3 to 6 carbon atoms and/or the oligosaccharide being formed by oligomerization of monosaccharides having 3 to 6 carbon atoms with and aldehyde part or all of the free hydroxyl groups may be converted to hemiacetals. In a preferred embodiment at least 50 mol-% of the hydroxyl groups, more preferably 60 to 99 mol-% of the hydroxyl groups, especially 65 to 95 mol-% of the hydroxyl groups and especially preferred 70 to 90 mol-% of the hydroxyl groups as for example more than 60 mol-%, more than 65 mol-%, more than 70 mol-%, or 50 to 99 mol-%, 50 to 95 mol-%, 50 to 90 mol-%, 60 to 95%, 60 to 90 mol-%, 65 to 99 mol-%, 65 to 90 mol-%, 70 to 99 mol-% or 70 to 95 mol-% of the hydroxyl groups are converted to hemiacetals. In case the degree of conversion is low some unreacted hydroxyl groups of the monosaccharide having 3 to 6 carbon atoms and/or the oligosaccharide formed by oligomerization of monosaccharides having 3 to 6 carbon atoms remain in the composition. The presence of residual hydroxyl groups in the reaction mixture has proven to be advantageous as upon its reaction with sulfhydryl compounds the formation of solid precipitate gets reduced.

In a particularly preferred embodiment the reaction product between the monosaccharide having 3 to 6 carbon atoms and/or the oligosaccharide respectively the monohydric alcohol and the aldehyde is predominantly a mixture of hemiacetals and acetals. Preferred are reaction products wherein the ratio between hemiacetals and acetals on a molar basis is between 100:1 and 1:10 more preferably between 50:1 and 1:5 and especially between 20:1 and 1:1 as for example between 100:1 and 1:5 or between 100:1 and 1:1 or between 50:1 and 1:10 or between 50:1 and 1:1 or between 20:1 and 1:10 or between 20:1 and 1:5.

Reactions of aldehydes and ketones with alcohols are described in the literature. "Formaldehyde", p 265, Joseph Frederic Walker, reprint 1975, Robert E. Krieger Publishing Company Inc. discloses that hemiacetals are obtained when formaldehyde and alcohols are brought together under neutral or alkaline conditions, and that they form readily in the case of primary and secondary alcohols.

The synthesis of compounds of group I and group II may be accomplished in separate reactions. Preferably it is accomplished in a simultaneous reaction using a one pot reaction by charging a mixture of monohydric alcohol and monosaccharide having 3 to 6 carbon atoms and/or oligosaccharide formed by oligomerization of monosaccharides having 3 to 6 carbon atoms and reacting this mixture with an aldehyde having one or two carbon atoms. A one-pot reaction is especially preferred when the aldehyde used for the reaction with the monohydric alcohol is the same as the aldehyde used for the reaction with the monosaccharide having 3 to 6 carbon atoms and/or the oligosaccharide formed by oligomerization of monosaccharides having 3 to 6 carbon atoms.

For ease of reaction the presence of an aqueous solvent has proven to be advantageous. Preferably the reaction is made in the presence of 5 to 70 wt.-%, more preferably in the presence of 10 to 50 wt.-% and especially in the presence of 15 to 40 wt.-% of water in respect to the overall reaction mass. Often the amount of water introduced by the reactants like for example by formalin is sufficient. In a preferred embodiment the water remains in the reaction product.

In the synthesis of compounds of group I and group II the molar ratio of hydroxyl groups in the monohydric alcohol respectively the monosaccharide having 3 to 6 carbon atoms and/or the oligosaccharide formed by oligomerization of monosaccharides having 3 to 6 carbon atoms to carbonyl groups of the aldehyde is preferably between 20:1 and 1:5 and more preferably between 10:1 and 1:2 and especially between 2:1 and 1:1 as for example between 20:1 and 1:2 or between 20:1 and 1:1 or between 10:1 and 1:5 or between 10:1 and 1:1 or between 2:1 and 1:5 or between 2:1 and 1:2. In a preferred embodiment the reactants are reacted in a substantially stoichiometric ratio.

However, in order to reduce the presence of residual free (unreacted) aldehyde in the final product to extremely low levels it has proven to be advantageous not to proceed to full reaction of all hydroxyl groups, i.e. to react only part of the hydroxyl groups of the alcohol of group I and/or of the monosaccharide having 3 to 6 carbon atoms and/or the oligosaccharide formed by oligomerization of monosaccharides having 3 to 6 carbon atoms of group II with the aldehyde. Accordingly, in a preferred embodiment the reaction between the monohydric alcohol and the aldehyde is made with less than the stoichiometric amount of aldehyde compound in respect to the hydroxyl groups of the alcohol. In a further preferred embodiment the reaction between the monosaccharide having 3 to 6 carbon atoms and/or the oligosaccharide formed by oligomerization of monosaccharides having 3 to 6 carbon atoms and the aldehyde having one or two carbon atoms is made with less than the stoichiometric amount of aldehyde compound in respect to the hydroxyl groups of the monosaccharide having 3 to 6 carbon atoms and/or the oligosaccharide formed by oligomerization of monosaccharides having 3 to 6 carbon atoms. A preferred molar ratio of aldehyde groups to hydroxyl groups is between 1.01:1.50 and especially between 1.05 and 1.20 as for example between 1.01 and 1.20 or between 1.05 and 1.50. The ratios given above similarly apply for the reaction of the aldehyde compound with the monohydric alcohol of group I respectively with the monosaccharide having 3 to 6 carbon atoms and/or the oligosaccharide being formed by oligomerization of monosaccharides having 3 to 6 carbon atoms of group II in separate reaction steps as well as for the reaction with their mixture in a one-pot reaction. For separate reactions part or all of the aldehyde used for the reaction with the monohydric alcohol can be substituted by a ketone.

Group III

The group III component is optional. The group III compound is the reaction product from formaldehyde with ammonia and/or an amine, the amine being selected from the group consisting of primary alkyl amines having 1 to 10 carbon atoms and primary hydroxy alkyl amines having 2 to 10 carbon atoms. This group comprises the synergist component of the inventive composition according to the second and fourth aspect of the invention.

Preferred primary amines comprise 1 to 4 carbon atoms, preferred primary hydroxy amines 2 to 4 carbon atoms. Especially preferred primary hydroxy amines correspond to the formula (7)

HO-A-NH$_2$  (7)

wherein A is a linear or branched alkylene group with 2 to 4 carbon atoms.

Examples of nitrogen containing compounds suitable for the present invention include, but are not limited to: ammonia, methylamine, ethylamine, propylamine, isopropyl amine, monoethanolamine, 1-amino-2-propanol, 3-amino-1-propanol, 2-amino-1-butanol, 3-amino-1-butanol, 3-amino-1-butanol, 2-ethoxypropylamine, 3-ethoxypropylamine, 1-methoxyisopropylamine and 2-methoxyethylamine.

The nitrogen containing compound and formaldehyde may be reacted in any molar ratio with a preferred ratio being from 1 mole aldehyde to 10 moles nitrogen containing compound to 10 moles aldehyde to 1 mole nitrogen containing compound, a more preferred ratio being from 1 mole aldehyde to 5 moles nitrogen containing compound to 5 moles aldehyde to 1 mole nitrogen containing compound, an even more preferred ratio being 1 mole aldehyde to 3 moles nitrogen containing compound to 3 moles aldehyde to 1 mole nitrogen containing compound and a most preferred ratio being 1 mole aldehyde to 1 mole nitrogen containing compound.

The structure of the aminal formed from the reaction of formaldehyde and the nitrogen containing compound is dependent upon the selected nitrogen containing compound and the selected molar ratio between formaldehyde and nitrogen compound, as is self-evident to those of ordinary skill in the art. Similarly, mixtures of the above nitrogen containing compounds may also be reacted in order to form singular, or mixtures of various aminals as is also evident to one of ordinary skill in the art.

In one preferred embodiment the reaction product corresponds to formula (7a)

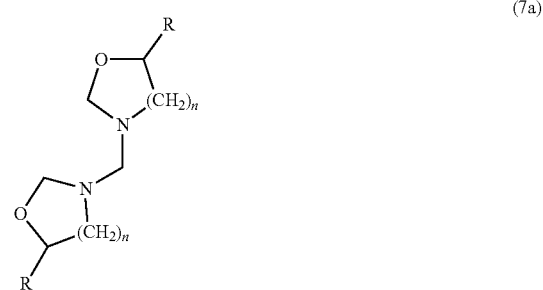

wherein
R is H or methyl, and
n is 1 or 2.

In an especially preferred embodiment R is CH$_3$. In another especially preferred embodiment, n is 1. In a particularly preferred embodiment n is 1 and R is CH$_3$. The name of this compound is 3,3'-methylenebis-5-methyl-oxazolidine (MBO).

In another preferred embodiment the reaction product corresponds to formula (7b)

wherein each R$^2$ is C$_1$ to C$_4$ alkyl or C$_2$ to C$_4$ hydroxy alkyl. Examples for especially preferred compounds are hexahydro-1,3,5-trimethyl-s-triazine, hexahydro-1,3,5-triethyl-s-triazine, hexahydro-1,3,5-tris(hydroxymethyl)-s-triazine and hexahydro-1,3,5-tris(2-hydroxyethyl)-s-triazine.

Mixtures of different reaction products of structures 7a and 7b are equally suited. The substituents R and R$^2$ may be the same or different.

Group IV

The group IV component is optional. The group IV compound is an inorganic or organic alkaline compound. This group comprises the solids suppression agent of the inventive composition according to the third and fourth aspect of the invention.

The solid usually formed by the reaction of group I and group II compounds with hydrogen sulfide is 1,3,5-trithiane. Addition of an alkaline compound to the compounds of groups I and II prevents or at least retards the formation of the poorly soluble 1,3,5-trithiane upon their reaction with sulfhydryl compounds. Without being bound to this theory it is believed that different intermediates as for example polyoxymethylenesulfide oligomers are formed and stabilized by the presence of the alkaline compound of group IV. By preventing the formation of solids the scavenging composition remains homogeneous and especially in a contact tower application allows for more efficient and up to quantitative use of the (hemi-)acetals of group I and II compounds and thereby reduces the amount of chemicals required. This may result in an extended gas breakthrough time in such scavenging applications. Additionally, in direct injection applications for continuous scavenging of sulfhydryl compounds from e.g. natural gas streams the removal of the liquid reaction products is much easier than removal of solids and it is not prone to blockage of tubings and vessels.

Furthermore, in the presence of an alkaline compound of group IV the stability of compounds I and II is increased and e.g. gassing of formaldehyde is further reduced or even prevented. This leads to a further reduced level of free formaldehyde in the space above the composition and thereby further improves the safety of the personnel handling the inventive composition.

Preferably, the compound of group IV is soluble in, or miscible with the mixture of compounds of groups I and II. In a further preferred embodiment the compound of group IV is soluble in, or miscible with the formulation of the mixture of compounds of groups I and II in the presence of an aqueous solvent.

In a preferred embodiment, the alkaline compound is selected from the group consisting of
  IV(a). alkaline metal salts or alkaline earth metal salts,
  IV(b). ammonia; alkyl amines, aryl amines or alkylaryl amines,
  IV(c). hydroxy alkyl amines, hydroxy aryl amines or hydroxy alkylaryl amines,
  IV(d). multifunctional amines, and
  IV(e). mixtures of compounds of groups IV(a) to IV(c).

In an aryl amine, the N atom is bonded to the aromatic system. In an alkyl aryl amine, the N atom may be bonded to either the aromatic system or the alkyl group.

Preferred cations of the alkaline metal and alkaline earth metal salts IV(a) are derived from lithium, sodium, potassium, rubidium, beryllium, magnesium, calcium and strontium with sodium, potassium and calcium being especially preferred. Preferred anions are hydroxyl and carbonate groups with hydroxyl being especially preferred.

Examples for preferred alkali or alkaline earth metal salts LiOH, NaOH, KOH, $Mg(OH)_2$, $Ca(OH)_2$, $Be(OH)_2$, $Na_2CO_3$, $K_2CO_3$, $NaHCO_3$, $KHCO_3$, $BeCO_3$, $MgCO_3$, $CaCO_3$, $Mg(HCO_3)_2$, $Ca(HCO_3)_2$ and their mixtures. Especially preferred alkali and alkaline earth metal salts of group IVa are NaOH, KOH, $Mg(OH)_2$ and $Ca(OH)_2$.

The amines of group IV(b) may be primary, secondary or tertiary amines. Preferred amines have up to 20 carbon atoms, more preferably between 1 and 10 and especially between 2 and 4 carbon atoms as for example between 1 and 20, between 1 and 4, between 2 and 20 or between 2 and 10 carbon atoms. Preferred hydrocarbyl residues are alkyl, aryl and alkylaryl residues, with alkyl residues being particularly preferred. In secondary and tertiary amines the hydrocarbyl residues may be the same or different. Especially preferred amines are alkyl amines with 1 to 4 carbon atoms per alkyl residue. Examples for especially preferred amines are methylamine, dimethylamine, trimethylamine, ethylamine, diethylamine, triethylamine, propylamine, isopropylamine and butylamine.

The hydroxy amine of group IV(c) may be a primary, secondary or tertiary amine. It may contain one, two or three hydroxy groups. In a preferred embodiment each hydrocarbyl substituent of the nitrogen is substituted by not more than one hydroxy group. Preferred amines have up to 20 carbon atoms, more preferably between 1 and 10 and especially between 2 and 4 carbon atoms as for example between 1 and 20, between 1 and 4, between 2 and 20 or between 2 and 10 carbon atoms. In secondary and tertiary amines the hydrocarbyl respectively hydroxyalkyl residues may be the same or different. Preferred hydrocarbyl residues are alkyl, aryl and alkylaryl residues, with alkyl residues being particularly preferred. Especially preferred hydroxy amines are hydroxyalkyl amines with 1 to 4 carbon atoms per alkyl residue. Examples for especially preferred hydroxy amines of group IV(c) are monoethanolamine, diethanolamine, 1-amino-2-propanol, 3-amino-1-propanol, 2-amino-1-butanol, 3-amino-1-butanol, 3-amino-1-butanol, 2-ethoxypropylamine, 3-ethoxypropylamine, 1-methoxyisopropylamine, 2-methoxyethylamine, 2-(2-aminoethoxy) ethanol, dimethylethanolamine, N-methyldiethanolamine and monomethylethanolamine.

Preferred multifunctional amines of group IV(d) contain, besides an amino group, at least one further functional group selected from the group consisting of amino groups, ether groups and acid groups or an ester, amide or salt thereof. Preferred multifunctional amines have up to 50 carbon atoms, more preferably between 1 and 20 and especially between 2 and 10 carbon atoms as for example between 1 and 50, between 1 and 10, between 2 and 50 or between 2 and 20 carbon atoms. The hydrocarbon chains may be linear, branched and/or cyclic. In a preferred embodiment they contain 1 to 10 and especially 2 to 5 as for example 1 to 5 further amino groups and/or ether groups. Preferably the amino- and/or ether groups are separated by at least two carbon atoms. Examples for especially preferred multifunctional amines of group IV(d) are ethylenediamine, diethylenetriamine, triethylenetetramine, tetraethylenepentamine, poly(ethylene imine), propylene diamine, dipropylenetriamine, N,N-dimethyldipropylenetriamine, aminoethylenepiperazine, aminoethylethanolamine, tallow fatty propylene diamine ethoxylated with 2 to 20 moles ethylene oxide, oleyl amine ethoxylated with 2 to 20 mole ethylene oxide, morpholine and piperazine.

In a further preferred embodiment the multifunctional amines of group IV(d) contain, besides an amino group, an acid group or an ester, amide or salt thereof. Preferred acid groups are sulfonic acids, phosphoric acids and carboxylic acids. Especially preferred multifunctional amines carrying a carboxylic acid group are amino acids. Preferred amino acids include proteinogenic and non-proteinogenic amino acids. The amino group and the carboxylic acid group may be located at the same or at different carbon atoms. Carboxylic acid groups and other acidic groups are especially preferred in their neutralized form, e.g. as alkaline or earth alkaline salts. Especially preferred amino acids contain further functional groups including, hydroxyl, carboxyl, amide, ether, guanidino, hydroxyphenyl, imidazolyl and/or further amine groups. Examples of preferred multifunctional amines carrying and acid group are glycine, alanine, leucine, isoleucine, proline, serine, threonine, asparagine, glutamine, phenylalanine, tryptophan, tyrosine, valine, aspartic acid, glutamic acid, methionine, sarcosine and taurine and their carboxylate salts with sodium and/or potassium. Especially preferred amino acids are glycine, lysine, histidine and arginine.

When mixtures IV(d) of alkaline compounds of the groups IV(a) to IV(c) are used, they may comprise 2 or more, preferably 2 to 10 and especially 3 to 5 as for example two, three, four or five different components selected form the groups IV(a) to IV(c). The portion of each individual compound in the mixture of the compounds of groups IV(a) to IV(c) is preferably between 5 and 95 wt.-%, more preferably between 10 and 90 wt.-% and especially between 20 and 80 wt.-% as for example between 5 and 90 wt.-%, between 5 and 80 wt.-%, between 10 and 95 wt.-%, between 10 and 80 wt.-%, between 20 and 95 wt.-% or between 20 and 90 wt.-%.

Group V

The group V component is optional. This group comprises emulsion breakers, demulsifiers and/or non-emulsifiers. The purpose of having the compounds of group V present is to prevent the formation of emulsions during the scavenging process and to improve the efficiency of the scavenging process. Often metal sulfides as for example iron sulfide are formed e.g. by corrosion of pipelines and equipment in the presence of sulfhydryl compounds. Being in the form of fine solids they accumulate at the oil water interface, thereby stabilizing the water present in the oil and generating a stable emulsion which may affect phase separation and accessibility of the sulfhydryl compounds to be scavenged. The purpose of the emulsion breaker, demulsifier and/or non-emulsifier is to break the oil/water emulsion by creating a preferentially water wet surface on the metal sulfide and also to modify the surface tension at the oil/water interface which is stabilized by the metal sulfides to one allowing coalescence of the emulsion.

In a preferred embodiment, the emulsion breaker of group V is part of the inventive composition comprising compounds of groups I and II, of groups I, II and III, of groups I, II and IV or of groups I, II, III and IV. Preferred emulsion breakers are polymeric nonionic surfactants, including but not limited to polysorbates, polymers comprising ethylene oxide, polymers comprising propylene oxide, ethylene oxide-propylene oxide copolymers, alkyl polyglucosides such as decyl maltoside, alkylphenol ethoxylates, and ethoxylated and/or propoxylated alkyl phenol-formaldehyde resins. The emulsion breaker can also be a fatty alcohol alkoxylated with 1 to 200 moles, preferably with 2 to 100 moles and especially with 5 to 50 moles as for example with 1 to 100 moles or 1 to 50 moles or 2 to 50 moles or with 5 to 100 moles of alkylene oxide. Examples for preferred alkylene oxides are ethylene oxide, propylene oxide and their mixtures; preferred fatty alcohols have a $C_4$- to $C_{36}$-alkyl residue and especially a $C_8$- to $C_{24}$-alkyl residue as for example a $C_4$- to $C_{24}$-alkyl residue or a $C_8$- to $C_{32}$-alkyl residue such as cetyl alcohol and oleyl alcohol.

In a preferred embodiment, the emulsion breaker is a compound according to the formula (8)

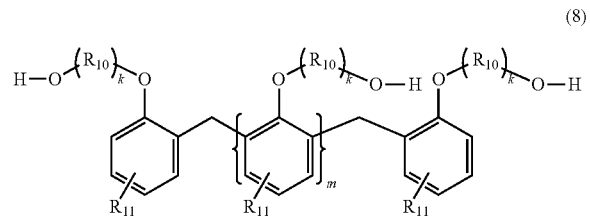

(8)

wherein $R_{10}$ $C_2$ to $C_4$ alkylene $R_{11}$ $C_1$ to $C_{18}$ alkyl k a number from 1 to 200 m a number from 1 to 100 is.

In a preferred embodiment $R_{10}$ is an ethylene or a propylene group. $R_{10}$ may represent mixtures of different $C_2$ to $C_4$ alkylene groups, preferably ethylene and propylene groups.

In another preferred embodiment, $R_{11}$ is a $C_4$ to $C_{12}$ alkyl group, more preferably a tertiary butyl group or an iso-nonyl group.

In formula (8), $R_{10}$, $R_{11}$ and k may be the same in each of the repeating units, or they may differ from unit to unit.

In another preferred embodiment k is a number from 2 to 20.

In another preferred embodiment m is a number from 3 to 20.

In another specific preferred embodiment the emulsion breaker is an alkylbenzenesulfonic as for example dodecylbenzesulfonic acid (9) or its salt with an alkaline metal, ammonia or a primary, secondary or tertiary amine as for example methylamine, ethylamine, propylamine, diethylamine, dimethylamine, trimethylamine, ethanolamine, diethanolamine or triethanolamine.

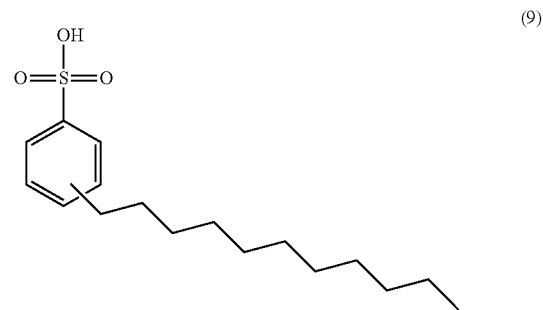

(9)

In another preferred embodiment, the demulsifier is a mixture of at least one compound of formula (8) and an alkylbenzene sulfonic acid (9) or its salt. Such mixture preferably contains (8) and sulfonic acid (9), respectively its salt, in a weight ratio of from 5:1 to 1:5, more preferably in a weight ratio of from 3:1 to 1:3.

The polymeric nonionic surfactant may be added to the further components of the inventive composition neat or preferably dissolved or suspended in a solvent. Any solvent suitable for dissolving or suspending a polymeric nonionic surfactant may be used. Examples of suitable solvents include water, ethylene glycol, propylene glycol, butylene glycol, oligoethylene glycols, oligopropylene glycols, ethers including glycol ethers like methoxyethane, dimethoxyethane and butoxyethanol, alcohols, toluene, xylene, aromatic naphtha, or any combination thereof. The alcohol may include any alcohol suitable for use with oil recovery and for dissolving the polymeric nonionic surfactant and is preferably selected from the group consisting of methanol, ethanol, propanol, isopropyl alcohol, butanol, 2-ethyl hexanol or any combination thereof.

Group VI

The group VI component is optional. This group comprises corrosion inhibitors and serves to add corrosion inhibition functionality to the inventive composition. The addition of a corrosion inhibitor may not be required because the synergist of group III provides sufficient corrosion inhibition to protect the integrity of the whole asset. However, often addition of a further corrosion inhibitor is advisable to reduce the overall corrosivity, protecting the tubulars and production equipment from corrosion caused by oilfield fluids and gases into which the instant invention is deployed.

A preferred embodiment of the current invention is to use alkyl dimethyl benzyl ammonium chloride according to formula (10) as a corrosion inhibitor that also provides functionality as an interfacial tension reducer.

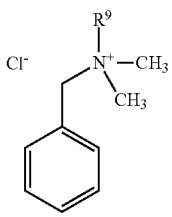

(10)

wherein $R^9$ is $C_8$ to $C_{18}$ alkyl.

The inventive composition may additionally contain biocides, for example, formaldehyde or glutaraldehyde, water dispersants such as polyacrylamide based dispersants, oxygen scavengers, antifoams such as acetylenic diols, silicones or polyethoxylated antifoams, and/or flocculants. Preferably their content is less than 10 wt.-% and especially less than 5 wt.-% relative to the components of the groups I to VI.

In a preferred embodiment, the inventive composition comprises 1 to 60 wt.-% based on its content of active components of groups I to IV of the reaction product of the monohydric alcohol described above in group I, preferably between 5 and 50 wt.-% and especially between 10 and 40 wt.-% as for example between 1 and 50 wt.-% or between 1 and 40 wt.-% or between 5 and 60 wt.-% or between 5 and 40 wt.-% or between 10 and 60 wt.-% or between 10 and 50 wt.-%.

In a preferred embodiment, the inventive composition comprises 1 to 95 wt.-% based on its content of active components of groups I to IV of the reaction product of the monosaccharide having 3 to 6 carbon atoms and/or the oligosaccharide being formed by oligomerization of monosaccharides having 3 to 6 carbon atoms described above in group II, preferably between 10 and 90 wt.-%, more preferably between 20 and 80 wt.-% and especially between 25 and 75 wt.-% as for example between 1 and 90 wt.-% or between 1 and 80 wt.-% or 1 and 75 wt.-% or between 10 and 95 wt.-% or between 10 and 80 wt.-% or between 10 and 75 wt.-% or between 20 an d95 wt.-% or between 20 and 90 wt.-% or between 20 and 75 wt.-% or between 25 and 90 wt.-% or between 25 and 80 wt.-%.

The molar ratio between the reaction product of the monohydric alcohol and an aldehyde or ketone (group I) and the reaction product of the monosaccharide having 3 to 6 carbon atoms and/or the oligosaccharide being formed by oligomerization of monosaccharides having 3 to 6 carbon atoms and an aldehyde having one or two carbon atoms (group II) is preferably between 20:1 and 1:20, preferably between 10:1 and 1:10 and especially between 5:1 and 1:5 as for example between 20:1 and 1:10, between 20:1 and 1:5, between 10:1 and 1:20, between 10:1 and 1:5, between 5:1 and 1:20 or between 5:1 and 1:10.

In a preferred embodiment, the inventive composition comprises 0.1 to 20 wt.-% based on its content of active components of groups I to IV of the synergist described above in group III, preferably between 0.5 and 15 wt.-% and especially between 1 and 10 wt.-% as for example between 0.1 and 15 wt.-% or between 0.1 and 10 wt.-% or between 0.5 and 20 wt.-% or between 0.5 and 10 wt.-% or between 1 and 20 wt.-% or between 1 and 15 wt.-%.

The weight ratio between the reaction products of group I and group II together and the synergist (group III) on the other hand side is preferably between 1000:1 and 5:1, more preferably between 500:1 and 10:1 and especially between 100:1 and 10:1 as for example between 1000:1 and 10:1, between 500:1 and 5:1 or between 100:1 and 5:1.

In a preferred embodiment, the inventive composition comprises 0.1 to 15 wt.-% based on its content of active components of groups I to IV of at least one solids suppression agent described above in group IV, preferably between 0.5 and 10 wt.-% and especially between 1 and 8 wt.-%, as for example between 1 and 10 wt.-% or between 1 and 8 wt.-% or between 5 and 15 wt.-% or between 5 and 8 wt.-% or between 7 and 15 wt.-% or between 7 and 10 wt.-%.

In a preferred embodiment, the inventive composition comprises 0.1 to 10 wt.-% based on its content of active components of groups I to VI of at least one emulsion breaker described above in group V, preferably between 0.5 and 5 wt.-%.

In a preferred embodiment, the inventive composition comprises 0.1 to 10 wt.-% based on its content of active components of groups I to VI of the corrosion inhibitor described above in group VI, preferably between 0.2 and 5 wt.-%.

In a preferred embodiment the compounds of groups I to IV sum up to 100 wt.-%. In a further preferred embodiment the compounds of groups I to IV sum up to 100 wt.-%.

The inventive composition is preferably applied to the oil or gas to be treated in amounts of 0.5 to 50 wt.-ppm, more preferably 1 to 30 wt.-ppm and especially 2 to 20 wt.-ppm as for example 0.5 to 30 wt.-ppm, 0.5 to 20 wt.-ppm, 1 to 50 wt.-ppm, 1 to 20 wt.-ppm, 2 to 50 wt.-ppm or 2 to 30 wt.-ppm per 1 ppm of sulfur contained in the oil or gas.

The use of undiluted compositions according to the invention has proven especially successful in gas contact towers.

In a preferred embodiment the compositions according to the different aspects of the invention are used in formulations additionally comprising water. The water in the formulation may be formed during the manufacture of hemiacetals, or it can be introduced as a solvent for the reactants or it can be added to the composition to balance the formulation. Preferably water is present in a concentration from 1 to 90 wt.-%, preferably between 5 and 80 wt.-% as for example between 1 and 80 wt.-% or between 5 and 90 wt.-% of the formulation. In another preferred embodiment water is present to balance up to 100 wt.-% of the formulation.

Alternatively, any balance remaining in a formulated composition according to the different aspects of the invention is made up with water and/or glycol and/or alcohol based solvents in the amounts given above for water alone. Preferred alcohols and glycols are selected from, but not limited to, methanol, ethanol, propan-1-ol, propan-2-ol, ethylene glycol, diethylene glycol, triethylene glycol, neopentyl glycol, 2-butoxyethanol, glycerol and their mixtures.

The inventive compositions can be made by mixing of the compounds of groups I and II, of groups I, II and III, of groups I, II and IV respectively of groups I, II, II and IV each optionally with compounds of groups V and/or VI. The sequence of addition of the individual compounds is not important. In a preferred embodiment the compounds of groups I and II are produced simultaneously in a single pot reaction and subsequently the compounds of groups III and/or IV and optionally V and/or VI are added. For the production of formulations water and/or other solvents can be added to the inventive composition. Alternatively, some or all of the components to make up the inventive composition may contain solvent.

A formulated product containing the inventive composition and solvent is preferably applied in concentrations between 5 and 40,000 mg/L, preferably between 50 and 30,000 mg/L and especially between 100 and 25,000 mg/L as for example between 5 and 40,000 mg/L, between 5 and 25,000 mg/L, between 50 and 40,000 mg/L, between 50 and 25,000 mg/L, between 100 and 40,000 mg/L and between 100 and 30,000 mg/L based on the volume of oil or gas production to be treated. The preferred and best suited concentration of the formulation depends on the formulation activity itself, the type and amount of sulfhydryl compounds to be scavenged, static conditions, temperature and salinity of the system. Furthermore, the material grade of the equipment used for operating the scavenging process should be taken into account: If e.g. a contact tower is made of stainless steel a more concentrated product can be applied while it has proven to be advantageous to apply more dilute product formulations, preferably containing a corrosion inhibitor of group VI, if a poor material of construction as for example carbon steel is used.

At the given concentration range, the inventive composition provides substantial scavenging of sulfhydryl compounds from the treated liquids and gases and ensures a specified sulfur content of e. g. the produced hydrocarbon as it is brought to the market and therefore its safe handling. Furthermore flowability of the treated hydrocarbon will not be impaired due to retardation resp. prevention of the formation of solid sulfhydryl reaction products.

The present invention also includes a process for application of the inventive composition in scavenging of sulfhydryl compounds present in the drilling and the production cycle of mineral oil, particularly as a component of well work-over, well intervention, production enhancement and flow assurance packages.

The composition according to the invention may be injected into a sulfhydryl compound containing stream together with other ingredients known to those familiar with the art. Such other ingredients include acids, dispersants, viscosifiers, lubricity agents, scale inhibitors, friction reducers, cross linker, surfactants, pH adjuster, iron control agents, breakers; this is especially advantageous if any produced water (or recycled water) is in contact with the compositions of the instant invention.

Employing the embodiments of the instant invention allows either i) for a lower dosage rate of scavenger to obtain the same level of residual amount of sulfhydryl compound or ii) for a lower level of residual amount of sulfhydryl compound with the same dosage rate of scavenger in comparison to hemiacetals and/or acetals according to the state of the art. Additionally, in combination with a reaction product from formaldehyde and an amine the kinetics of scavenging $H_2S$ and/or mercaptans provided by the mixture of hemiacetals and/or acetals containing the reaction products of a monohydric alcohol with an aldehyde and/or ketone and of a monosaccharide having 3 to 6 carbon atoms and/or an oligosaccharide being formed by oligomerization of monosaccharides having 3 to 6 carbon atoms with an aldehyde having one or two carbons atoms can be significantly accelerated. This allows for a much more efficient scavenging of sulfhydryl compounds especially in applications where only short contact times between the oil or gas and the scavenger are available, as for example in contact towers and direct injection applications for treatment of gases. By admixture of a solids suppression agent to the mixture of hemiacetals and/or acetals containing the reaction products of a monohydric alcohol with an aldehyde and/or ketone and of a monosaccharide having 3 to 6 carbon atoms or a disaccharide with an aldehyde having one or two carbons atoms as a further synergistic additive the gas breakthrough time of a system containing sulfhydryl compounds is extended. While improving the scavenging of sulfhydryl compounds no formation of complex and difficult to treat emulsions is observed. Furthermore the embodiments of the instant invention will not corrode the oilfield equipment that it comes into contact with, nor will it allow the deposition of unwanted solids, such as polymethylene-sulfide oligomers and metal sulfide scales, so often found with applications of the prior art. Other applications of the embodiments of the instantaneous invention include treating water for downhole injection for pressure support, treatment of drilling and work-over operations, wettability alteration and well cleanout.

Within this specification, percentages are weight percentages unless specified otherwise.

EXAMPLES

Preparation of Hemiacetals

Method A (using paraformaldehyde, PFA): The amounts of alcohols and/or sugars and water given in table 1 were charged into a stirred reactor. 0.25 wt.-% (based on the mass of alcohols) of sodium hydroxide solution at 50 wt.-% was added. This mixture was homogenized for 10 minutes before paraformaldehyde (PFA, 93 wt.-%) was added in the amount given in table 1 over a period of approximately 30 minutes. The reaction mixture was warmed while stirring for 8 hours at a temperature between 80 to 85° C. After the reaction time, the mixture was cooled to 30° C.

Method B (using aqueous formaldehyde, AFA): A stirred reactor was charged with the quantities of an aqueous solution of formaldehyde (AFA, 37 wt.-%) given in table 1. Then, amounts of alcohols and/or sugars given in table 1 were added followed by 0.25 wt.-% (based on the mass of alcohols) of sodium hydroxide solution at 50 wt.-%. This mixture was homogenized for 10 minutes before heating the stirred reaction mixture to a temperature between 80 to 85° C. for 8 hours. After the reaction time, the mixture was cooled to 30° C.

The reaction products are characterized by the molar amounts of hemiacetal in respect to the total amount of hydroxyl groups charged and the content of free formaldehyde ($CH_2O$) as determined by $^1H$ NMR spectroscopy.

Further materials used were hexahydro-1,3,5-trimethyl-s-triazin (HTT) and 3,3'-methylenebis-5-methyloxazolidine (MBO) as the synergists according to group III.

triethylamine (TEA), monoethanolamine (MEA), piperazine (PIP), 5 wt.-% aqueous solution of NaOH (NaOH), and the monosodium salt of glycine (GLY) as the solids suppressants according to group IV. All these materials were commercial grades.

TABLE 1

Preparation of (hemi-)acetals

| (hemi-)acetal | monohydric alcohol | charge [g] | sugar | charge [g] | water [g] | formaldehyde source | charge [g] | acetalized [mol-%] | $CH_2O$ [wt.-%] |
|---|---|---|---|---|---|---|---|---|---|
| A1 (comp.) | methanol | 500 | — | 0 | 0 | PFA | 500 | 98% | 0.07 |
| A2 (comp.) | ethanol | 600 | — | 0 | 0 | PFA | 420 | 99% | 0.06 |
| A3 (comp.) | i-propanol | 600 | — | 0 | 0 | PFA | 320 | 99% | 0.08 |
| A4 (comp.) | 2-EH | 800 | — | 0 | 0 | PFA | 200 | 98% | 0.11 |
| A5 (comp.) | — | 0 | glucose | 780 | 0 | AFA | 1036 | 76 | 0.07 |
| A6 (comp.) | — | 0 | sucrose | 1033 | 988 | PFA | 624 | 71 | 0.12 |
| A7 (comp.) | — | 0 | xylose | 694 | 0 | AFA | 1200 | 73 | 0.09 |
| A8 | methanol | 128 | glucose | 721 | 982 | PFA | 620 | 79 | 0.05 |
| A9 | methanol | 64 | sucrose | 685 | 736 | PFA | 464 | 75 | 0.10 |
| A10 | methanol | 80 | xylose | 375 | 511 | PFA | 323 | 74 | 0.06 |
| A11 | methanol | 96 | fructose | 772 | 0 | AFA | 877 | 58 | 0.07 |
| A12 | methanol | 96 | lactose | 1027 | 500 | PFA | 872 | 95 | 0.11 |
| A13 | ethanol | 157 | lactose | 1663 | 0 | AFA | 1738 | 67 | 0.09 |

2-EH = 2-ethyl hexanol

Scavenger Performance Tests—Efficiency

In order to demonstrate the improved efficiency of the instant invention in removing sulfhydryl compounds compared to group I respectively group II compounds alone, the removal of $H_2S$ from an oil and from an oil/water mixture was measured.

The oil used was a mixture of kerosene with 10% of xylene with zero bottom sediment and water (BS&W) to simulate oil field conditions.

The oil/water mixture was a mixture of the oil described above and brine (in a 50:50 volume ratio of oil to aqueous phase) to mimic the efficiency in hydrated crude oil.

In a 500 mL stirred autoclave (Parr reactor), 350 mL of the oil respectively the oil/brine mixture was de-aerated for 1 hour with $N_2$, then saturated with a sour gas mixture of 0.2 wt.-% $H_2S$ and 99.8 wt. % $CO_2$, by purging this gas into the oil resp. oil/brine mixture with a flow rate of 0.6 L/min. After equilibration by the sour gas mixture, 1000 ppm of the composition to be tested was injected into the autoclave by an HPLC pump.

For reasons of better comparability of performance tests the compositions given in tables 2 and 3, containing (hemi-)acetal, synergist and/or solids suppressant as active materials, were applied as 50 wt.-% active aqueous formulations. The portions of (hemi-)acetal, synergist and solids suppressant given in tables 2, 3 and 4 refer to the portion of the respective component in the active material, therefore summing up to 100%. For preparation of the compositions given in tables 2, 3 and 4 the water content introduced during preparation of the (hemi-)acetals A1 to A13 according to table 1 was taken into account.

The performance tests were carried out at 30° C. and under 1 bar, using a gas chromatograph to measure the outlet $H_2S$ content in the gas phase every two minutes. Then, a graph of the measured values of $H_2S$ content (ppm) versus time (min) was plotted. The amount of hydrogen sulfide scavenged is the area above the resultant performance curve, which is calculated by the integration of the curve. For all samples the integration of the curve was done up to 60 min after the injection of $H_2S$-scavenger. As the output parameter of this performance test $L_{sc}/kgH_2S$ (Liters of $H_2S$ scavenger required to remove 1 kg of $H_2S$ from the system) has been determined for 6 minutes and 1 hour of analysis. All consumption values ($L_{sc}/kgH_2S$) refer to the amount of 100% active composition consumed in the test and are averages of three repeat tests. The test results have been summarized in Table 2 and Table 3. Percentages mean weight percent if not indicated otherwise. Ratios in mixtures of (hemi-)acetals refer to the mass portions of active material.

TABLE 2

Performance tests for $H_2S$-scavengers in oil (zero BS&W)

| example | (hemi)acetal type | amount [wt %] | synergist type | amount [wt %] | solids suppressant type | amount [wt %] | $L_{sc}$/kg $H_2S$ @ 6 min. | @ 1 hour |
|---|---|---|---|---|---|---|---|---|
| P1 (comp.) | A1 | 100 | — | 0 | — | 0 | 19.45 | 8.70 |
| P2 (comp.) | A2 | 100 | — | 0 | — | 0 | 20.76 | 9.56 |
| P3 (comp.) | A3 | 100 | — | 0 | — | 0 | 21.23 | 10.04 |
| P4 (comp.) | A5 | 100 | — | 0 | — | 0 | 19.53 | 9.43 |
| P5 (comp.) | A6 | 100 | — | 0 | — | 0 | 19.10 | 9.53 |
| P6 (comp.) | A1 + A2 (1:1) | 100 | — | 0 | — | 0 | 19.12 | 9.85 |
| P7 (comp.) | A5 + A6 (1:1) | 100 | — | 0 | — | 0 | 18.87 | 9.06 |
| P8 | A1 + A5 (1:1) | 100 | — | 0 | — | 0 | 14.56 | 7.80 |

TABLE 2-continued

Performance tests for H$_2$S-scavengers in oil (zero BS&W)

| example | (hemi)acetal type | amount [wt %] | synergist type | amount [wt %] | solids suppressant type | amount [wt %] | L$_s$/kg H$_2$S @ 6 min. | @ 1 hour |
|---|---|---|---|---|---|---|---|---|
| P9 | A1 + A6 (1:2) | 100 | — | 0 | — | 0 | 15.18 | 7.59 |
| P10 | A2 + A5 (1:3) | 100 | — | 0 | — | 0 | 15.21 | 8.07 |
| P11 | A8 | 100 | — | 0 | — | 0 | 13.61 | 7.01 |
| P12 | A9 | 100 | — | 0 | — | 0 | 13.43 | 6.93 |
| P13 (comp.) | A1 | 98 | MBO | 2 | — | 0 | 5.31 | 4.22 |
| P14 (comp.) | A2 | 98 | MBO | 2 | — | 0 | 5.65 | 4.63 |
| P15 (comp.) | A3 | 98 | MBO | 2 | — | 0 | 5.86 | 4.86 |
| P16 (comp.) | A5 | 98 | MBO | 2 | — | 0 | 5.52 | 4.67 |
| P17 (comp.) | A6 | 98 | MBO | 2 | — | 0 | 5.37 | 4.49 |
| P18 | A1 + A5 (1:1) | 98 | MBO | 2 | — | 0 | 3.27 | 2.94 |
| P19 | A1 + A6 (1:2) | 98 | MBO | 2 | — | 0 | 3.98 | 3.00 |
| P20 | A2 + A6 (1:3) | 98 | MBO | 2 | — | 0 | 3.95 | 2.97 |
| P21 | A3 + A5 (1:3) | 98 | MBO | 2 | — | 0 | 4.01 | 3.06 |
| P22 | A8 | 96 | HTT | 4 | — | 0 | 3.40 | 3.01 |
| P23 | A9 | 96 | HTT | 4 | — | 0 | 3.35 | 2.98 |
| P24 | A12 | 96 | HTT | 4 | — | 0 | 3.16 | 2.72 |
| P25 (comp.) | A1 | 93 | — | 0 | GLY | 7 | 3.10 | 2.70 |
| P26 (comp.) | A2 | 93 | — | 0 | MEA | 7 | 3.23 | 2.87 |
| P27 (comp.) | A5 | 95 | — | 0 | NaOH | 5 | 3.17 | 2.84 |
| P28 (comp.) | A6 | 93 | — | 0 | PIP | 7 | 3.45 | 2.93 |
| P29 | A1 + A5 (1:1) | 93 | — | 0 | GLY | 7 | 3.23 | 2.83 |
| P30 | A8 | 93 | — | 0 | GLY | 7 | 3.09 | 2.90 |
| P31 | A8 | 95 | — | 0 | NaOH | 5 | 3.16 | 2.92 |
| P32 | A9 | 93 | — | 0 | PIP | 7 | 3.25 | 2.89 |
| P33 | A9 | 93 | — | 0 | MEA | 7 | 3.38 | 3.04 |
| P34 (comp.) | A1 | 93 | MBO | 2 | MEA | 5 | 4.46 | 3.93 |
| P35 (comp.) | A2 | 90 | MBO | 2 | PIP | 8 | 4.76 | 4.06 |
| P36 (comp.) | A3 | 88 | MBO | 2 | TEA | 10 | 4.80 | 4.12 |
| P37 (comp.) | A5 | 93 | MBO | 2 | MEA | 5 | 4.53 | 3.87 |
| P38 (comp.) | A6 | 90 | MBO | 2 | PIP | 8 | 4.38 | 3.62 |
| P39 | A1 + A5 (1:1) | 93 | MBO | 2 | MEA | 5 | 2.65 | 2.36 |
| P40 | A1 + A6 (1:2) | 93 | MBO | 2 | MEA | 5 | 2.30 | 2.08 |
| P41 | A2 + A5 (1:2) | 88 | MBO | 2 | TEA | 10 | 2.78 | 2.48 |
| P42 | A3 + A6 (1:3) | 93 | MBO | 2 | MEA | 5 | 2.89 | 2.31 |
| P43 | A8 | 93 | MBO | 2 | MEA | 5 | 2.38 | 2.21 |
| P44 | A8 | 89 | HTT | 4 | GLY | 7 | 2.37 | 2.09 |
| P46 | A8 | 91 | HTT | 4 | NaOH | 5 | 2.40 | 2.11 |
| P47 | A9 | 89 | HTT | 4 | PIP | 7 | 2.41 | 2.23 |
| P48 | A9 | 89 | HTT | 4 | MEA | 7 | 2.39 | 2.17 |
| P49 | A11 | 89 | HTT | 4 | GLY | 7 | 2.47 | 2.19 |
| P50 | A12 | 89 | HTT | 4 | GLY | 7 | 2.38 | 2.10 |

TABLE 3

Performance tests for H$_2$S-scavenging in a mixture of the oil and brine (50:50 volume ratio of oil to aqueous phase)

| example | (hemi)acetal type | amount [wt %] | synergist type | amount [wt %] | solids suppressant type | amount [wt %] | L$_s$/kg H$_2$S @ 6 min. | @ 1 hour |
|---|---|---|---|---|---|---|---|---|
| P51 (comp.) | A1 | 100 | — | 0 | — | 0 | 23.36 | 10.04 |
| P52 (comp.) | A2 | 100 | — | 0 | — | 0 | 23.82 | 10.20 |
| P53 (comp.) | A4 | 100 | — | 0 | — | 0 | 28.51 | 14.21 |

TABLE 3-continued

Performance tests for H₂S-scavenging in a mixture of the oil and brine
(50:50 volume ratio of oil to aqueous phase)

| example | (hemi)acetal type | amount [wt %] | synergist type | amount [wt %] | solids suppressant type | amount [wt %] | $L_s$/kg $H_2S$ @ 6 min. | @ 1 hour |
|---|---|---|---|---|---|---|---|---|
| P54 (comp.) | A5 | 100 | — | 0 | — | 0 | 22.64 | 9.84 |
| P55 (comp.) | A7 | 100 | — | 0 | — | 0 | 21.84 | 9.21 |
| P56 (comp.) | A1 + A2 (1:1) | 100 | — | 0 | — | 0 | 21.87 | 9.95 |
| P57 | A1 + A5 (1:1) | 100 | — | 0 | — | 0 | 18.97 | 7.99 |
| P58 | A1 + A7 (1:3) | 100 | — | 0 | — | 0 | 19.14 | 8.05 |
| P59 | A4 + A7 (1:1) | 100 | — | 0 | — | 0 | 19.46 | 8.11 |
| P60 | A2 + A5 (1:1) | 100 | — | 0 | — | 0 | 19.21 | 8.07 |
| P61 | A8 | 100 | — | 0 | — | 0 | 18.75 | 7.94 |
| P62 | A10 | 100 | — | 0 | — | 0 | 18.81 | 7.96 |
| P63 | A11 | 100 | — | 0 | — | 0 | 18.72 | 8.01 |
| P64 (comp.) | A1 | 94 | HTT | 6 | — | 0 | 8.76 | 7.04 |
| P65 (comp.) | A2 | 98 | MBO | 2 | — | 0 | 8.40 | 6.88 |
| P66 (comp.) | A4 | 98 | HTT | 2 | — | 0 | 8.45 | 7.12 |
| P67 (comp.) | A5 | 98 | MBO | 2 | — | 0 | 8.56 | 6.96 |
| P68 (comp.) | A7 | 94 | HTT | 6 | — | 0 | 8.63 | 7.01 |
| P69 | A1 + A5 (1:1) | 98 | MBO | 2 | — | 0 | 7.95 | 6.84 |
| P70 | A1 + A7 (2:1) | 94 | HTT | 6 | — | 0 | 8.03 | 6.99 |
| P71 | A4 + A7 (1:3) | 94 | HTT | 6 | — | 0 | 7.86 | 6.91 |
| P72 | A2 + A5 (1:2) | 98 | MBO | 2 | — | 0 | 7.94 | 6.90 |
| P73 | A8 | 94 | HTT | 6 | — | 0 | 7.77 | 6.84 |
| P74 | A10 | 98 | MBO | 2 | — | 0 | 7.83 | 6.72 |
| P75 | A10 | 94 | HTT | 6 | — | 0 | 7.71 | 6.76 |
| P76 (comp.) | A1 | 95 | — | 0 | NaOH | 5 | 7.56 | 6.66 |
| P77 (comp.) | A2 | 93 | — | 0 | GLY | 7 | 7.62 | 6.71 |
| P78 (comp.) | A4 | 93 | — | 0 | MEA | 7 | 7.70 | 6.78 |
| P79 (comp.) | A5 | 93 | — | 0 | GLY | 7 | 7.63 | 6.70 |
| P80 (comp.) | A7 | 93 | — | 0 | PIP | 7 | 7.68 | 6.73 |
| P81 | A8 | 93 | — | 0 | GLY | 7 | 7.60 | 6.69 |
| P82 | A8 | 93 | — | 0 | MEA | 7 | 7.61 | 6.70 |
| P83 | A10 | 93 | — | 0 | GLY | 7 | 7.64 | 6.63 |
| P84 | A10 | 93 | — | 0 | MEA | 7 | 7.62 | 6.65 |
| P85 | A13 | 90 | — | 0 | TEA | 10 | 7.84 | 6.82 |
| P86 | A2 + A5 (1:4) | 90 | — | 0 | MEA | 10 | 7.60 | 6.67 |
| P87 | A10 | 90 | — | 0 | MEA | 10 | 7.61 | 6.65 |
| P88 (comp.) | A1 | 89 | HTT | 6 | NaOH | 5 | 6.91 | 5.72 |
| P89 (comp.) | A2 | 88 | MBO | 2 | MEA | 10 | 6.52 | 5.56 |
| P90 (comp.) | A5 | 88 | MBO | 2 | MEA | 10 | 7.05 | 5.92 |
| P91 (comp.) | A7 | 89 | HTT | 6 | NaOH | 5 | 7.06 | 5.95 |
| P92 | A1 + A5 (1:1) | 88 | MBO | 2 | MEA | 10 | 6.95 | 5.62 |
| P93 | A1 + A7 (2:1) | 89 | HTT | 6 | NaOH | 5 | 6.97 | 5.78 |
| P94 | A4 + A7 (1:3) | 89 | HTT | 6 | NaOH | 5 | 7.00 | 5.94 |
| P95 | A2 + A5 (1:2) | 89 | HTT | 4 | GLY | 7 | 6.63 | 5.60 |
| P96 | A8 | 89 | HT | 6 | NaOH | 5 | 6.57 | 5.59 |
| P97 | A8 | 89 | HTT | 4 | GLY | 7 | 6.53 | 5.54 |
| P98 | A8 | 89 | HTT | 4 | MEA | 7 | 6.55 | 5.56 |
| P99 | A9 | 91 | HTT | 4 | NaOH | 5 | 6.71 | 5.60 |
| P100 | A9 | 89 | HTT | 4 | PIP | 7 | 6.69 | 5.63 |
| P101 | A10 | 88 | MBO | 2 | MEA | 10 | 6.60 | 5.59 |
| P102 | A10 | 89 | HTT | 4 | GLY | 7 | 6.58 | 5.53 |
| P103 | A10 | 89 | HTT | 4 | PIP | 7 | 6.56 | 5.50 |
| P104 | A12 | 89 | HTT | 6 | NaOH | 5 | 6.50 | 5.49 |
| P105 | A13 | 89 | HTT | 6 | NaOH | 5 | 6.66 | 5.67 |

In tables 2 and 3 the lower consumption of the scavenger to remove 1 kg of $H_2S$, the more efficient is the scavenger.

In the inventive examples the mixtures of acetals being based on mixtures of a monohydric alcohols and a monosaccharide having 3 to 6 carbon atoms and/or an oligosaccharide being formed by oligomerization of monosaccharides having 3 to 6 carbon atoms are more efficient than the single components. The efficiency is further improved by the incorporation of a synergist and/or a solids suppressant. Furthermore, incorporation of the synergist enhances the reaction rate in the initial phase of the test as can be seen from the difference between scavenging efficiency after 6 minutes versus 1 hour.

Scavenger Performance Tests—Gas Breakthrough

The performance of the $H_2S$ scavengers according to the invention was evaluated for their ability to remove $H_2S$ from a flowing gas stream by passing gas laden with $H_2S$ through a column of fluid containing the scavenger chemical. A sour gas mixture of 0.2% $H_2S$ and 99.8% $CO_2$ was purged with a flow rate of 60 mL/min through 440 mL of a 22% active solution of the scavenger composition in water. Under these conditions the average contact time of gas and scavenger was about 4 seconds. Initially all of the $H_2S$ is removed from the gas stream and no $H_2S$ is detected in the effluent gas. At some point in time (the breakthrough time or TBT) the chemical can no longer entirely remove $H_2S$ from the gas stream and $H_2S$ is observed in the effluent. This parameter is a measure of the efficacy of the scavenger especially for contact tower applications with short contact time. The longer the break through time the more efficient is the chemical scavenger.

The effect of the solids suppression agent is rated by visual inspection of the spent scavenger fluid after the gas breakthrough test. The degree of solids formation is rated opaque>turbid>opalescent>clear.

The overall concentration of the scavenger formulations in all examples is 22 wt.-% (active ingredients), i. e. in examples where synergist and/or solids suppressant is present the concentration of (hemi-)acetals is reduced accordingly.

TABLE 4

Gas breakthrough times for different (hemi-)acetals

| example | (hemi-)acetal type | amount [wt.-%] | synergist type | amount [wt-%] | solids suppressant type | amount [wt-%] | TBT [min] | visual inspection |
|---|---|---|---|---|---|---|---|---|
| B1 (comp.) | A1 | 100 | — | 0 | — | 0 | 31 | opaque |
| B2 (comp.) | A2 | 100 | — | 0 | — | 0 | 29 | opaque |
| B3 (comp.) | A3 | 100 | — | 0 | — | 0 | 27 | opaque |
| B4 (comp.) | A5 | 100 | — | 0 | — | 0 | 30 | opaque |
| B5 (comp.) | A6 | 100 | — | 0 | — | 0 | 31 | opaque |
| B6 (comp.) | A7 | 100 | — | 0 | — | 0 | 29 | opaque |
| B7 (comp.) | A1 + A2 (1:1) | 100 | — | 0 | — | 0 | 35 | opaque |
| B8 (comp.) | A5 + A7 (1:1) | 100 | — | 0 | — | 0 | 37 | opaque |
| B9 | A1 + A5 (1:1) | 100 | — | 0 | — | 0 | 38 | opaque |
| B10 | A1 + A7 (2:1) | 100 | — | 0 | — | 0 | 34 | opaque |
| B11 | A2 + A7 (1:3) | 100 | — | 0 | — | 0 | 37 | opaque |
| B12 | A3 + A7 (1:2) | 100 | — | 0 | — | 0 | 36 | opaque |
| B13 | A8 | 100 | — | 0 | — | 0 | 45 | opaque |
| B14 | A9 | 100 | — | 0 | — | 0 | 38 | opaque |
| B15 | A10 | 100 | — | 0 | — | 0 | 43 | opaque |
| B16 | A11 | 100 | — | 0 | — | 0 | 42 | opaque |
| B17 | A12 | 100 | — | 0 | — | 0 | 39 | opaque |
| B18 | A13 | 100 | — | 0 | — | 0 | 37 | opaque |
| B19 (comp.) | A1 | 93 | MBO | 7 | — | 0 | 76 | turbid |
| B20 (comp.) | A2 | 97 | HTT | 3 | — | 0 | 69 | turbid |
| B21 (comp.) | A3 | 95 | HTT | 5 | — | 0 | 68 | turbid |
| B22 (comp.) | A5 | 97 | HTT | 3 | — | 0 | 75 | turbid |
| B23 (comp.) | A6 | 93 | MBO | 7 | — | 0 | 70 | turbid |
| B24 (comp.) | A7 | 93 | MBO | 7 | — | 0 | 73 | turbid |
| B25 | A1 + A5 (1:1) | 97 | HTT | 3 | — | 0 | 78 | turbid |
| B26 | A1 + A6 (2:1) | 97 | HTT | 3 | — | 0 | 74 | turbid |
| B27 | A2 + A7 (1:3) | 95 | MBO | 5 | — | 0 | 79 | turbid |
| B28 | A3 + A5 (1:2) | 95 | HTT | 5 | — | 0 | 76 | turbid |
| B29 | A8 | 96 | HTT | 4 | — | 0 | 80 | turbid |
| B30 | A9 | 96 | HTT | 4 | — | 0 | 76 | turbid |
| B31 | A10 | 96 | HTT | 4 | — | 0 | 77 | turbid |
| B32 | A12 | 97 | HTT | 3 | — | 0 | 78 | turbid |
| B33 | A13 | 93 | MBO | 7 | — | 0 | 75 | turbid |
| B34 (comp.) | A1 | 90 | — | 0 | MEA | 10 | 149 | opalescent |
| B35 (comp.) | A2 | 85 | — | 0 | PIP | 15 | 146 | opalescent |
| B36 (comp.) | A3 | 85 | — | 0 | PIP | 15 | 134 | opalescent |
| B37 (comp.) | A5 | 85 | — | 0 | PIP | 15 | 140 | opalescent |
| B38 (comp.) | A5 | 93 | — | 0 | GLY | 7 | 143 | opalescent |
| B39 (comp.) | A7 | 90 | — | 0 | MEA | 10 | 142 | opalescent |

TABLE 4-continued

Gas breakthrough times for different (hemi-)acetals

| example | (hemi-)acetal type | amount [wt.-%] | synergist type | amount [wt-%] | solids suppressant type | amount [wt-%] | TBT [min] | visual inspection |
|---|---|---|---|---|---|---|---|---|
| B40 | A1 + A5 (1:1) | 85 | — | 0 | PIP | 15 | 146 | opalescent |
| B41 | A1 + A6 (2:1) | 85 | — | 0 | PIP | 15 | 140 | opalescent |
| B42 | A2 + A7 (1:3) | 85 | — | 0 | PIP | 15 | 144 | opalescent |
| B43 | A3 + A5 (1:2) | 85 | — | 0 | PIP | 15 | 145 | opalescent |
| B42 | A8 | 93 | — | 0 | GLY | 7 | 149 | opalescent |
| B43 | A8 | 93 | — | 0 | MEA | 7 | 147 | opalescent |
| B44 | A9 | 95 | — | 0 | NaOH | 5 | 145 | opalescent |
| B45 | A9 | 93 | — | 0 | TEA | 7 | 143 | opalescent |
| B46 | A10 | 93 | — | 0 | GLY | 7 | 148 | opalescent |
| B47 | A10 | 93 | — | 0 | PIP | 7 | 145 | opalescent |
| B38 | A11 | 85 | — | 0 | PIP | 15 | 146 | opalescent |
| B39 | A12 | 90 | — | 0 | MEA | 10 | 143 | opalescent |
| B48 (comp.) | A1 | 83 | MBO | 7 | MEA | 10 | 215 | clear |
| B49 (comp.) | A2 | 82 | HTT | 3 | PIP | 15 | 200 | clear |
| B50 (comp.) | A3 | 90 | HTT | 5 | PIP | 15 | 192 | clear |
| B51 (comp.) | A5 | 82 | HTT | 3 | PIP | 15 | 203 | clear |
| B51 (comp.) | A6 | 90 | HTT | 3 | GKY | 7 | 193 | clear |
| B52 (comp.) | A7 | 83 | MBO | 7 | MEA | 10 | 201 | clear |
| B53 | A1 + A5 (1:1) | 82 | HTT | 3 | PIP | 15 | 210 | clear |
| B54 | A1 + A6 (2:1) | 82 | HTT | 3 | PIP | 15 | 201 | clear |
| B58 | A2 + A7 (1:3) | 80 | MBO | 5 | PIP | 15 | 202 | clear |
| B59 | A3 + A5 (1:2) | 80 | HTT | 5 | PIP | 15 | 200 | clear |
| B60 | A8 | 89 | HTT | 4 | GLY | 7 | 217 | clear |
| B61 | A8 | 89 | HTT | 4 | MEA | 7 | 214 | clear |
| B62 | A9 | 89 | HTT | 4 | TEA | 7 | 203 | clear |
| B63 | A9 | 89 | HTT | 4 | PIP | 7 | 207 | clear |
| B64 | A10 | 91 | HTT | 4 | NaOH | 5 | 215 | clear |
| B56 | A11 | 82 | HTT | 3 | PIP | 15 | 208 | clear |
| B57 | A12 | 83 | MBO | 7 | MEA | 10 | 210 | clear |

A comparison of the inventive examples and the comparative examples shows that mixtures of (hemi-)acetals containing reaction products of a monohydric alcohol and a monosaccharide having 3 to 6 carbon atoms and/or an oligosaccharide being formed by oligomerization of monosaccharides having 3 to 6 carbon atoms have a higher TBT than the single components or mixtures of components of the same group. The addition of a synergist according to group III increases the H$_2$S scavenging activity of (hemi-)acetals and especially of mixtures of (hemi-)acetals significantly. The scavenging process becomes faster and more efficient. The addition of a solids suppressant further significantly improves the performance of the scavenger. Formation of solids is mostly inhibited which otherwise hampers the accessibility of part of the scavenger and furthermore bears the risk of clogging flow lines for the effluent. The enhancement in scavenging efficiency exceeds the stoichiometric H$_2$S scavenging capacity of the added synergist considerably.

The invention claimed is:

1. A process for the scavenging of hydrogen sulphide and/or mercaptans, comprising the step of adding to a medium comprising the hydrogen sulphide or mercaptans a composition comprising
   (I) at least one reaction product between a nitrogen-free monohydric alcohol and an aldehyde or ketone, and
   (II) at least one reaction product between a monosaccharide having 3 to 6 carbon atoms and/or an oligosaccharide being formed by oligomerization of monosaccharides having 3 to 6 carbon atoms and an aldehyde or ketone having one or two carbon atoms,
   wherein the reaction products (I) and (II) are hemiacetals and/or acetals.

2. The process according to claim 1, further comprising adding
   (III) at least one reaction product from formaldehyde and ammonia and/or an amine, selected from the group consisting of primary alkyl amines having 1 to 10 carbon atoms, and primary hydroxy alkyl amines having 2 to 10 carbon atoms.

3. The process according to claim 1, further comprising adding
   (IV) at least one inorganic or organic alkaline compound that functions as a solids suppression agent.

4. The process according to claim 1, wherein the aldehyde or ketone for the reaction with the monohydric alcohol (I) contains 1 to 10 carbon atoms.

5. The process according to one claim 1, wherein the aldehyde or ketone for the reaction with the monohydric alcohol (I) is selected from the group consisting of formaldehyde, paraformaldehyde, glyoxal, acetaldehyde, propionaldehyde, butyraldehyde and glutaraldehyde.

6. The process according to claim 1, wherein the formaldehyde for the reaction with the monosaccharide having 3 to 6 carbon atoms and/or the oligosaccharide being formed by oligomerization of monosaccharides having 3 to 6 carbon atoms (group II) is selected from the group consisting of formaldehyde, paraformaldehyde, acetaldehyde and glyoxal.

7. The process according to claim 1, wherein the aldehyde or ketone for both components (group I) and (group II) is formaldehyde.

8. The process according to claim 1, wherein the monohydric alcohol comprises 1 to 15 carbon atoms.

9. The process according to claim 1, wherein the monohydric alcohol is an aliphatic alcohol.

10. The process according to claim 1, wherein the monohydric alcohol is selected from the group consisting of methanol, ethanol, propanol, iso-propanol, n-butanol, iso-butanol, tert-butanol, pentanol, hexanol, heptanol and octanol, and any mixture thereof.

11. The process according to claim 1, wherein the monosaccharide having 3 to 6 carbon atoms and/or the oligosaccharide being formed by oligomerization of monosaccharides having 3 to 6 carbon atoms is a monosaccharide having 3 to 6 carbon atoms.

12. The process according to claim 1, wherein the monosaccharide is a linear polyhydroxycarbonyl compound having the general formula (1)

$$C_n(H_2O)_n \quad (1)$$

wherein n is an integer between 3 and 6.

13. The process according to claim 12 wherein n is between 4 and 6.

14. The process according to claim 13 wherein n is 5 or 6.

15. The process according to claim 1, wherein the monosaccharide is a polyhydroxyaldehyde of formula (2)

$$CHO-(CH-OH)_m-CH_2OH \quad (2)$$

wherein m is 1, 2, 3 or 4.

16. The process according to claim 1, wherein the monosaccharide is a polyhydroxyketone of formula (3)

$$HO-CH_2-C(=O)-(CH-OH)_p-CH_2OH \quad (3)$$

wherein p is 0, 1, 2 or 3.

17. The process according to claim 1, wherein the monosaccharide is a mixture of open-chain and cyclic form of the polyhydroxyaldehyde of formula (2) and the polyhydroxyketone according to formula (3).

18. The process according to claim 1, wherein the monosaccharide is selected from the group consisting of glucose, mannose, galactose, ribose, arabinose, xylose and fructose.

19. The process according to claim 1, wherein the monosaccharide having 3 to 6 carbon atoms and/or the oligosaccharide being formed by oligomerization of monosaccharides having 3 to 6 carbon atoms is an oligosaccharide being formed by oligomerization of monosaccharides having 3 to 6 carbon atoms.

20. The process according to claim 1, wherein the oligosaccharide being formed by oligomerization of monosaccharides having 3 to 6 carbon atoms is a disaccharide being formed by dimerization of monosaccharides having 3 to 6 carbon atoms.

21. The process according to claim 20, wherein the disaccharide formed by oligomerization of monosaccharides having 3 to 6 carbon atoms has the general formula (4)

$$C_y(H_2O)_{y-1} \quad (4)$$

wherein y is 10, 11 or 12.

22. The process according to claim 20, wherein the disaccharide is formed from aldoses and/or ketoses having 5 or 6 carbon atoms which are linked by a glycosidic linkage.

23. The process according to one or more of claim 19, wherein the oligosaccharide being formed by oligomerization of monosaccharides having 3 to 6 carbon atoms is selected from maltose, Isomaltose, cellobiose, trehalose, sucrose, isomaltulose, trehalulose, lactose, lactulose and raffinose.

24. The process according to claim 2, wherein the reaction product (III) of ammonia or an amine and formaldehyde corresponds to formula (7a)

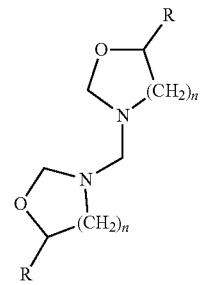

(7a)

wherein
R is H or methyl, and
n is 1 or 2.

25. The process according to claim 2, wherein the reaction product (III) of an amine and formaldehyde corresponds to the formula (7b)

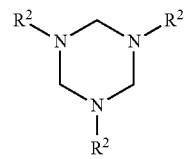

(7b)

wherein each $R^2$ is $C_1$ to $C_4$ alkyl or $C_2$ to $C_4$ hydroxy alkyl.

26. The process according to claim 24, wherein the compound of formula 7a is 3,3'-methylenebis-5-methyl-oxazolidine.

27. The process according to one or more of claim 2, wherein the reaction product (III) of an amine and formaldehyde is present in the composition in an amount from 1 wt.-% to 20 wt.-%.

28. The process according to claim 3, wherein the alkaline compound (IV) is selected from the group consisting of
   IV(a). alkaline metal salts or alkaline earth metal salts
   IV(b). ammonia; alkyl amines, aryl amines or alkylaryl amines
   IV(c). hydroxy alkyl amines, hydroxy aryl amines or hydroxy alkylaryl amines
   IV(d). multifunctional amines containing besides an amino group, at least one further functional group selected from the group consisting of amino groups, ether groups and acid groups or an ester, amide or salt thereof IV(e). mixtures of compounds of groups IV(a) to IV(c), wherein "alkyl" means $C_1$ to $C_{20}$ alkyl, "aryl" means $C_6$ to $C_{20}$ aryl and "alkylaryl" means $C_7$ to $C_{20}$ alkylaryl.

29. The process according to claim 1, comprising 1 to 60 wt.-% of the reaction product between a monohydric alcohol and an aldehyde or ketone.

30. The process according to claim 1, comprising 1 to 95 wt.-% of the reaction product between a monosaccharide having 3 to 6 carbon atoms and/or an oligosaccharide being formed by oligomerization of monosaccharides having 3 to 6 carbon atoms and an aldehyde or ketone.

31. The process according to claim 1, wherein the molar ratio between the reaction product between a monohydric alcohol and an aldehyde or ketone (group I) and the reaction product between a monosaccharide having 3 to 6 carbon atoms and/or an oligosaccharide being formed by oligomerization of monosaccharides having 3 to 6 carbon atoms and an aldehyde having one or two carbon atoms (group II) is between 20:1 and 1:20.

32. The process according to claim 2, wherein the weight ratio between the combined reaction products of groups (I) and group (II) on the one hand side and the synergist (group III) on the other hand side is between 1000:1 and 5:1.

33. The process according to claim 3, comprising 0.1 to 15 wt.-% of at least one solids suppression agent (group IV).

34. The process according to claim 1, further comprising an alkyl dimethyl benzyl ammonium chloride according to formula (10) in an amount between 0.01 and 5 wt.-%

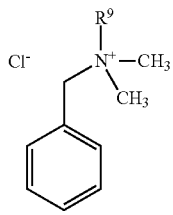

(10)

wherein $R^9$ is $C_8$ to $C_{18}$ alkyl.

35. The process according to claim 1, further comprising a demulsifier in an amount between 0.1 to 10 wt.-%.

36. The process according to claim 35, wherein the demulsifier is selected from the group consisting of polysorbates, fatty alcohols, polymers comprising ethylene oxide, polymers comprising propylene oxide, ethylene oxide-propylene oxide copolymers, alkyl polyglucosides, alkylphenol ethoxylates, alkyl polyethylene oxide, alkylbenzenesulfonic acid and ethoxylated and/or propoxylated alkyl phenol-formaldehyde resins.

37. The process according to claim 35, wherein the demulsifier corresponds to the formula (8)

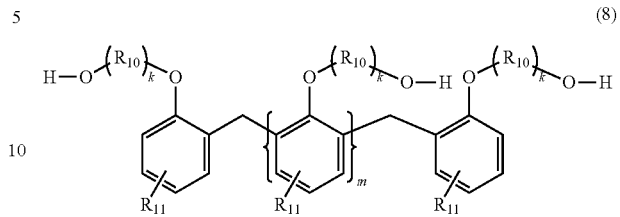

(8)

wherein
$R_{10}$ is $C_2$ to $C_4$ alkylene,
$R_{11}$ is $C_1$ to $C_{18}$ alkyl,
k is a number from 1 to 200,
m is a number from 1 to 100.

38. The process according to claim 35, wherein the demulsifier is dodecylbenezesulfonic acid (9)

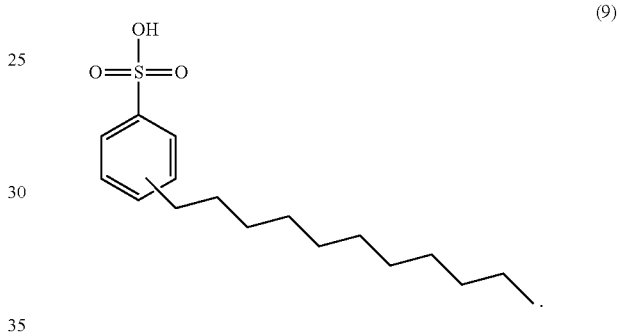

(9)

39. The process according to claim 35, wherein the demulsifier is a mixture of at least one compound of formula (8) and at least one compound of formula (9) in a weight ratio of from 5:1 to 1:5, preferably in a weight ratio of from 3:1 to 1:3.

40. A process for the scavenging of hydrogen sulphide and/or mercaptans, comprising adding to a medium comprising such hydrogen sulphide or mercaptans a formulation comprising
    10 to 99 wt.-% of a composition comprising
        I. at least one reaction product between a nitrogen-free monohydric alcohol and an aldehyde or ketone, and
        II. at least one reaction product between a monosaccharide having 3 to 6 carbon atoms and/or an oligosaccharide being formed by oligomerization of monosaccharides having 3 to 6 carbon atoms and an aldehyde or ketone having one or two carbon atoms,
        wherein the reaction products I. and II. are hemiacetals and/or acetals, and
    1 to 90 wt.-% of a solvent selected from the group consisting of water, methanol, ethanol, propan-1-ol, propan-2-ol, ethylene glycol, diethylene glycol, triethylene glycol, neopentyl glycol, 2-butoxyethanol, glycerol and their mixtures.

* * * * *